US012482421B2

(12) United States Patent
Yamamoto

(10) Patent No.: US 12,482,421 B2
(45) Date of Patent: Nov. 25, 2025

(54) DISPLAY DEVICE HAVING DRIVING TRANSISTOR TO DRIVE ELECTRO-OPTICAL ELEMENT

(71) Applicant: CANON KABUSHIKI KAISHA, Tokyo (JP)

(72) Inventor: Tetsuro Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/635,598

(22) Filed: Apr. 15, 2024

(65) Prior Publication Data

US 2024/0355284 A1 Oct. 24, 2024

(30) Foreign Application Priority Data

Apr. 18, 2023 (JP) ................................ 2023-068095
Feb. 6, 2024 (JP) ................................ 2024-016723

(51) Int. Cl.
*G09G 3/3233* (2016.01)

(52) U.S. Cl.
CPC ....... *G09G 3/3233* (2013.01); *G09G 2310/08* (2013.01); *G09G 2320/0247* (2013.01); *G09G 2330/021* (2013.01)

(58) Field of Classification Search
None
See application file for complete search history.

(56) References Cited

U.S. PATENT DOCUMENTS 10,102,804 B2* 10/2018 Tanikame ............ H10D 86/481
2003/0040149 A1* 2/2003 Kasai .................. G09G 3/3283 345/204
2009/0046041 A1* 2/2009 Tanikame ............ H10K 59/131 345/76
2010/0194716 A1* 8/2010 Park ..................... G09G 3/3233 345/204
2021/0082339 A1* 3/2021 Zhang .................. G09G 3/2092
2021/0366386 A1* 11/2021 Gao ..................... G09G 3/3258

(Continued)

FOREIGN PATENT DOCUMENTS

| | | | |
|---|---|---|---|
| JP | 2013029843 | A | 2/2013 |
| JP | 2019113835 | A | 7/2019 |
| JP | 2021039330 | A | 3/2021 |

*Primary Examiner* — Dorothy Harris

(74) *Attorney, Agent, or Firm* — Canon U.S.A., Inc. IP Division

(57) ABSTRACT

A display device includes a current-driven electro-optical element, a first supply, a second supply, a driving transistor, a correction transistor, an anode switching transistor, an initialization transistor, and a capacitive element. A current is supplied from the first supply. The second supply is lower in potential than the first supply. The driving transistor is configured to drive the electro-optical element in accordance with a written image signal. The correction transistor is coupled between a gate of the driving transistor and a second terminal of the driving transistor. The anode switching transistor is coupled between the second terminal of the driving transistor and an anode of the electro-optical element. The initialization transistor is coupled between the anode of the electro-optical element and the second supply. The capacitive element is coupled to the gate of the driving transistor. The correction, anode switching, and initialization transistors are n-channel transistors.

10 Claims, 18 Drawing Sheets

(56) References Cited

U.S. PATENT DOCUMENTS

| | | | | |
|---|---|---|---|---|
| 2022/0028338 | A1 | 1/2022 | Yang | |
| 2022/0165214 | A1* | 5/2022 | Liu | G09G 3/3233 |
| 2022/0172679 | A1* | 6/2022 | Akiyama | G09G 3/001 |
| 2023/0034225 | A1* | 2/2023 | Tanaka | G09G 3/3241 |
| 2023/0122487 | A1* | 4/2023 | Yang | G09G 3/20<br>345/81 |

* cited by examiner

PVDD
24
27
Vgs
23
Ids
22
25
310
26
21
Vcath
BEFORE t1

PVDD
24
27
23
22
25
310
26
Vthel+Vcath
21
Vcath
t=t1

PVDD
24
27
23
Vthel+Vcath
22
25
310
26
Vthel+Vcath
21
Vcath
t=t2

PVDD
24
27
Vsig
23
22
25
310
26
SIGNAL VOLTAGE
(Vsig)
21
Vcath
t=t3

PVDD
24
27
Vsig
23
Vgs
22
25
310
26
SIGNAL VOLTAGE
(Vsig)
21
Vcath
t=t4

PVDD
24
27
Vgs
23
Ids'
22
25
310
26
21
Vcath
t=t7

DISPLAY DEVICE HAVING DRIVING TRANSISTOR TO DRIVE ELECTRO-OPTICAL ELEMENT

BACKGROUND OF THE INVENTION

Field of the Invention

The present disclosure relates to a display device, a method of driving a display device, and an electronic device. More particularly, the present disclosure relates to a plane-type (flat-panel-type) display device in which pixels including electro-optical elements are arranged two-dimensionally in a matrix layout composed of rows and columns, a method of driving such a display device, and an electronic device including such a display device.

Description of the Related Art

In the field of display devices, use of plane-type display devices in which pixels (hereinafter referred to also as "pixel circuit") including light-emitting elements are arranged two-dimensionally in a matrix layout composed of rows and columns is rapidly spreading. One of examples of plane-type display devices is a display device in which so-called current-driven electro-optical elements, emission luminance of which changes in accordance with the value of an electric current flowing through the device, are used in its pixels. An organic electroluminescence (EL) element utilizing a phenomenon of emitting light in response to applying of an electric field to an organic thin film is known as a current-driven electro-optical element.

It is known that an organic EL display device including such organic EL elements in its pixels excels a liquid crystal display device in terms of low power consumption, high image recognition, a lightweight and flat body, and quick response.

With regard to organic EL display devices and the like, display devices conforming to an active-matrix scheme in which an electric current flowing through an electro-optical element is controlled by using an active element such as, for example, an insulated-gate-type field effect transistor has been developed actively, and a further improvement in image quality is demanded.

Japanese Patent Laid-Open No. 2019-113835 discloses a pixel circuit configured to display a desired flicker-free image by minimizing a leakage current in a pixel.

In the pixel circuit disclosed in Japanese Patent Laid-Open No. 2019-113835, all of transistors in one pixel are configured as p-channel transistors. When all of transistors that constitute a pixel are configured as p-channel transistors, the amplitude of driving lines for controlling the transistors will be large and, therefore, driving power increases. Moreover, since the source-drain leakage of a p-channel transistor during OFF is large, the gate potential of a driving transistor changes due to the influence of leakage during light emission and, therefore, a flicker phenomenon could occur.

SUMMARY OF THE INVENTION

The present disclosure provides a technique for reducing driving power by reducing the amplitude of driving lines for controlling transistors that constitute a pixel, in a display device with a reduction in changes in gate potential of a driving transistor.

One embodiment of the present disclosure provides a display device having a pixel circuit. The pixel circuit includes a current-driven electro-optical element, a first power supply, a second power supply, a signal line, a writing transistor, a driving transistor, a correction transistor, a second switching transistor, an initialization transistor, and a capacitive element. A current from the first power supply is supplied to the electro-optical element. The second power supply is lower in potential than the first power supply. An image signal is supplied to the electro-optical element via the signal line. A first terminal of the writing transistor is coupled to the signal line. A first terminal of the driving transistor is coupled to a second terminal of the writing transistor. The driving transistor is configured to drive the electro-optical element in accordance with an image signal written by the writing transistor. The correction transistor is coupled between a gate of the driving transistor and a second terminal of the driving transistor. The second switching transistor is coupled between the second terminal of the driving transistor and an anode of the electro-optical element. The initialization transistor is coupled between the anode of the electro-optical element and the second power supply. The capacitive element is coupled between the gate of the driving transistor and the first power supply. The correction transistor, the second switching transistor, and the initialization transistor are n-channel transistors.

Further features of the disclosure will become apparent from the following description of exemplary embodiments with reference to the attached drawings.

DESCRIPTION OF THE EMBODIMENTS

Figure 1:
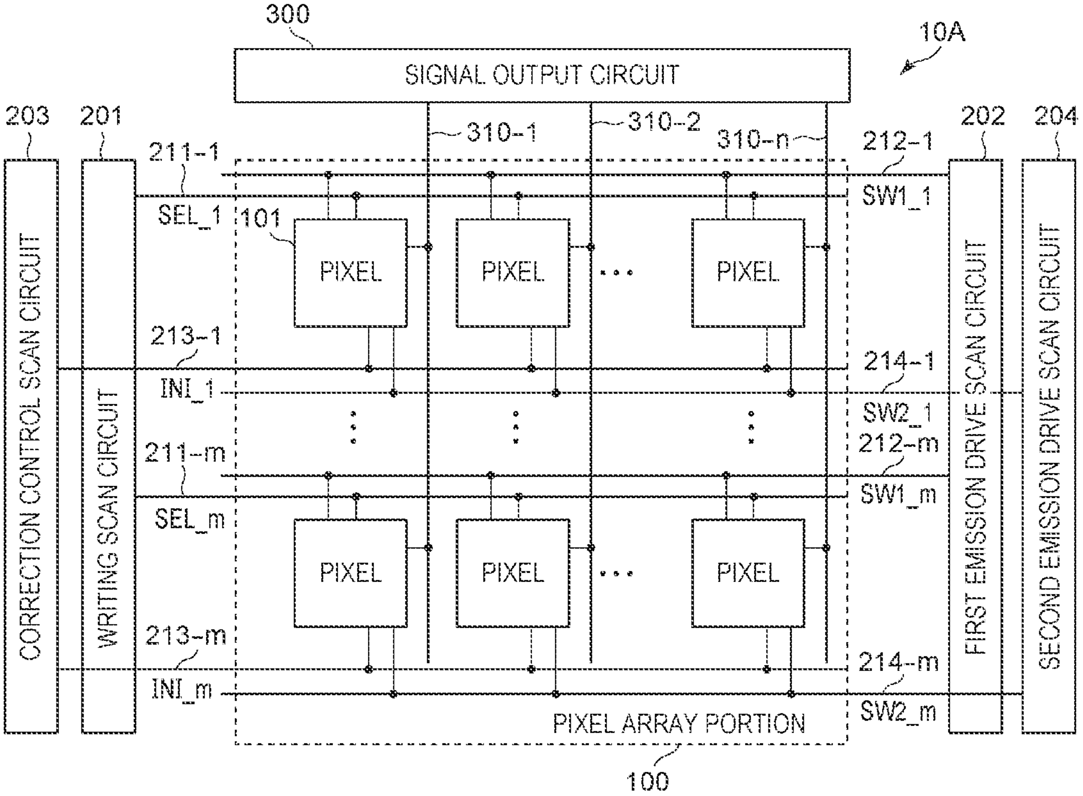
FIG. 1 is a system configuration diagram schematically illustrating a configuration of an active-matrix display device according to a first embodiment.

A display device according to one embodiment of the present disclosure is a display device that includes a pixel circuit. The pixel circuit includes a current-driven electro-optical element, a first power supply, a second power supply, a signal line, a writing transistor, a driving transistor, a correction transistor, a switching transistor connected to an anode of the electro-optical element, an initialization transistor, and a capacitor. A current from the first power supply is supplied to the electro-optical element; a signal line via which an image signal is supplied to the electro-optical element via the signal line. A source of the writing transistor is coupled to the signal line. A source of the driving transistor is coupled to a drain of the writing transistor and a drain of the driving transistor is electrically coupled to the electro-optical element. The correction transistor is coupled between a gate of the driving transistor and a drain of the driving transistor. The switching transistor is coupled between the drain of the driving transistor and an anode of the electro-optical element. The initialization transistor is coupled between the anode of the electro-optical element and a second power supply. The capacitor is coupled between the gate of the driving transistor and the first power supply.

The correction transistor, the switching transistor and the initialization transistor are n-channel transistors.

Since the leakage current of an n-channel transistor is smaller than that of a p-channel transistor, configuring the correction transistor and the switching transistor as n-channel transistors makes it possible to reduce a leakage current from the capacitor of the pixel circuit.

In this specification, a transistor is an electronic element that includes a gate, a source, and a drain. An electric current is inputted to the source. The electric current inputted to the source is outputted from the drain. The output from the drain is adjusted via the gate. The source and drain of a transistor could vary depending on a driving method. The source/drain of a transistor may be referred to as one of main terminals of the transistor. In particular, a writing transistor can be driven with its source and drain transposed, and the same holds true for a correction transistor. Though the terms "drain" and "source" will be used in the description below, they may be referred to as one (the other) and the other (one) of the main terminals of the transistor. The source/drain of a transistor will be hereinafter sometimes referred to as "first/second terminal". In a case where the first terminal is the source, the second terminal is the drain.

In this specification, the meaning of "a transistor is electrically connected" encompasses a case of connection via the transistor interposed therebetween.

In this specification, an oxide semiconductor may include indium oxide, gallium oxide, zinc oxide, or the like, or may be a composite thereof. For example, it may be InGaZnO. A transistor that includes an oxide semiconductor may be a transistor that includes an oxide semiconductor in an active region of the transistor.

A display device according to one embodiment of the present disclosure makes it possible to reduce flickers and thus enhance image quality by reducing a leakage current from a capacitor in a pixel circuit.

First Embodiment

With reference to the accompanying drawings, examples of a display device according to one embodiment of the present disclosure will now be described. All of the embodiments described below are just examples of the present disclosure. Numerical values, shapes, materials, components, layouts of components, modes of connection, and the like shall not be construed to restrict the scope of the present disclosure. In a first embodiment, a reduction of a leakage current from a capacitor will now be described.

FIG. 1 is a schematic view illustrating an example of a display device according to the present embodiment. A display device 10A includes a pixel array portion 100 and a driver portion disposed near the pixel array portion 100. The pixel array portion 100 includes a plurality of pixels 101 arranged two-dimensionally in a plurality of rows and columns.

A scan driving system and a signal supply system are provided as the driver portion for driving the pixels 101. The scan driving system includes a writing scan circuit 201, a first emission drive scan circuit 202, a correction control scan circuit 203, and a second emission drive scan circuit 204. The signal supply system includes a signal output circuit 300. In FIG. 1, the writing scan circuit 201 and the correction control scan circuit 203 are disposed to the left of the pixel array portion 100, and the first emission drive scan circuit 202 and the second emission drive scan circuit 204 are disposed to the right thereof. However, this layout configuration does not imply any limitation. That is, the layout relationship of the scan circuits described above may be reversed; alternatively, the writing scan circuit 201, the first emission drive scan circuit 202, the correction control scan circuit 203, and the second emission drive scan circuit 204 may be disposed at one side with respect to the pixel array portion 100. The following layout may also be adopted; a set made up of the writing scan circuit 201, the first emission drive scan circuit 202, the correction control scan circuit 203, and the second emission drive scan circuit 204 is disposed at each of the left and right sides with respect thereto.

One pixel in the display device may include a plurality of sub-pixels. The pixel 101, though labeled as "pixel" in FIG. 1, corresponds to sub-pixels of the display device. More specifically, for example, one pixel is made up of three sub-pixels including a sub-pixel configured to emit red (R) light, a sub-pixel configured to emit green (G) light, and a sub-pixel configured to emit blue (B) light. However, one pixel is not limited to a combination of sub-pixels of the three primary colors R, G, and B. That is, a sub-pixel of one color or sub-pixels of a plurality of colors may be added to sub-pixels of the three primary colors to make up one pixel. More specifically, for example, a sub-pixel configured to emit white (W) light for luminance enhancement may be additionally included in the configuration of one pixel, or at least one sub-pixel configured to emit complementary-color light for widening a color reproduction range may be additionally included in the configuration of one pixel.

In the pixel array portion 100, a first scan line (writing scan line) 211-1 to 211-*m*, a second scan line (first emission drive scan line) 212-1 to 212-*m*, a third scan line (correction control scan line) 213-1 to 213-*m*, and a fourth scan line (second emission drive scan line) 214-1 to 214-*m* are provided for each pixel row and extend in a row direction in such a way as to correspond to the matrix layout of the pixels 101 arranged in m rows and n columns. In addition, a signal line 310-1 to 310-*n* is provided for each pixel column and extends in a column direction (the direction in which respective pixels of pixel rows are arranged).

The pixel array portion 100 is generally formed on a transparent insulating substrate such as a glass substrate but is not limited thereto. For example, the pixel array portion 100 may be formed on a Si substrate, a metal substrate, or a substrate having plastic property.

Each of the writing scan circuit 201, the first emission drive scan circuit 202, the correction control scan circuit 203, and the second emission drive scan circuit 204 is configured as a shift register that shifts (transfers) a start pulse (not illustrated) sequentially in synchronization with a clock pulse (not illustrated).

The writing scan circuit 201, when writing an image signal into each of the pixels 101 of the pixel array portion 100, scans the pixels 101 of the pixel array portion 100 sequentially on a one-row-after-another basis by supplying a writing scan signal SEL (SEL_1 to SEL_m) sequentially to the first scan lines 211-1 to 211-*m* (progressive scan).

The first emission drive scan circuit 202 supplies, to the second scan lines 212 (212-1 to 212-*m*), a first emission drive signal SW1 (SW1_1 to SW1_*m*) for performing emission driving of the pixels 101 in synchronization with the progressive scan performed by the writing scan circuit 201. This emission drive signal SW1 is used for controlling emission/non-emission of the pixels 101.

The correction control scan circuit 203 supplies, to the third scan lines 213 (213-1 to 213-*m*), a correction control signal INI (INI_1 to INI_m) for performing threshold voltage correction operation of the pixels 101 in synchronization with the progressive scan performed by the writing scan circuit 201. This correction control signal INI is used for controlling threshold voltage correction operation of the pixels 101.

The second emission drive scan circuit 204 supplies, to the fourth scan lines 214 (214-1 to 214-*m*), a second emission drive signal SW2 (SW2_1 to SW2_*m*) for performing emission driving of the pixels 101 in synchronization with the progressive scan performed by the writing scan circuit 201. This second emission drive signal SW2, similarly to SW1, is used for controlling emission/non-emission of the pixels 101.

The signal output circuit 300 outputs a signal potential Vsig of an image signal depending on luminance information supplied from a signal supply source (not illustrated) (hereinafter may be simply referred to as "signal potential"). As the signal output circuit 300, for example, a known time-division-drive circuit configuration can be employed. A time-division-drive scheme is also called a selector scheme, where a plurality of signal lines is assigned as a unit (as a set) to one output terminal of a driver (not illustrated) that is a signal supply source. Then, the plurality of signal lines is selected sequentially in a time-divided manner and, on the other hand, an image signal outputted in time series for each output terminal of the driver is supplied in a time-divided manner to the selected signal line, thereby driving each signal line.

For example, if color display is taken as an example, three mutually adjacent pixel columns of R, G, and B are taken as a unit, and each image signal of R, G, B is inputted from the driver into the signal output circuit 300 in time series within one horizontal period. The signal output circuit 300 is configured as a multiplexer (selection switch) provided correspondingly to the three pixel columns of R, G, and B, and the multiplexer performs sequential ON operation in a time-divided manner, thereby writing each image signal of R, G, B into the corresponding signal line in a time-divided manner.

Though three pixel columns (signal lines) of R, G, and B are taken as a unit, this does not imply any limitation. Adopting this time-division-drive scheme (selector scheme) is advantageous in that it is possible to reduce the number of outputs of the driver and the number of wiring lines between the driver and the signal output circuit 300 to 1/x of the number of signal lines, where x denotes the number of time division (x is an integer that is not less than two). A signal referred to as an image signal in the present embodiment is referred to also as a video signal when the image that is displayed is a moving image.

The signal potential Vsig outputted from the signal output circuit 300 is written into the pixels 101 of the pixel array portion 100 on a one-row-after-another basis via the signal lines 310-1 to 310-*n* (progressive writing).

In FIG. 1, as an example of the present disclosure, a certain pixel and a pixel located on an adjacent pixel column are connected to the same writing scan line; however, pixels of odd columns may be connected to the same writing scan line. Though upper edges of pixels in a plan view are in alignment with each other, they may be not in alignment with each other.

Figure 2:
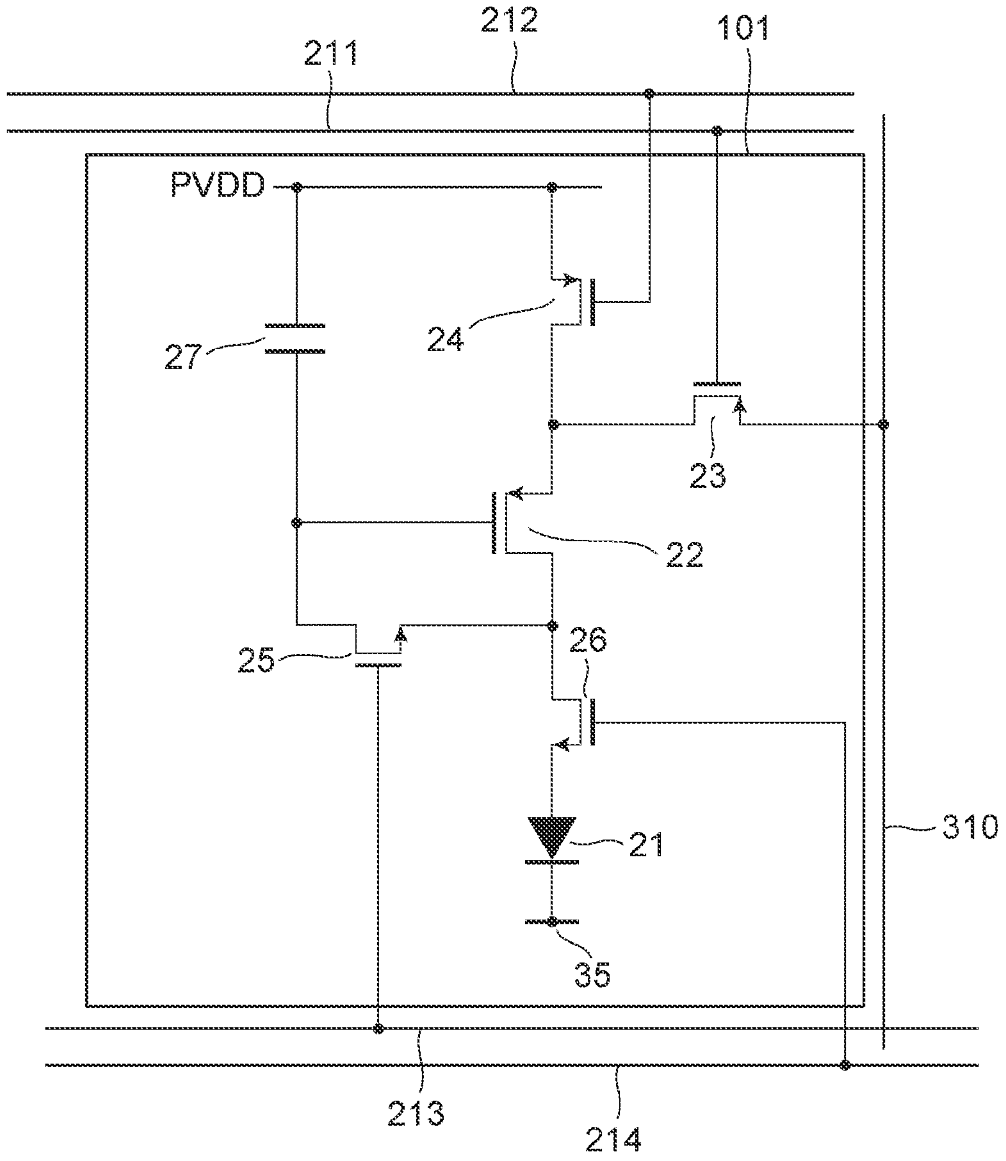
FIG. 2 is an example of a circuit diagram of a pixel according to the first embodiment.

FIG. 2 is a circuit diagram illustrating a specific example of the configuration of the pixel 101 used in the display device 10A according to the present embodiment. As illustrated in FIG. 2, the pixel 101 includes an organic EL element 21, which is an example of a current-driven electro-optical element whose emission luminance changes in accordance with an amount of an electric current that flows, and a pixel circuit configured to drive the organic EL element 21. The organic EL element 21 is connected at its cathode electrode to a common power supply line 35 that is provided in a shared manner (so-called solid-all-over wiring) for all of the pixels 101. Each cathode electrode may be connected to individual one of power supply lines different from one another.

The pixel circuit configured to drive the organic EL element 21 includes a driving transistor 22, a writing transistor 23, a supply switching transistor 24, a correction transistor 25, an anode switching transistor 26, and a capacitive element 27. The pixel circuit is referred to also as "driving circuit" because it is a circuit configured to drive a pixel. Though a capacitive element is provided in the present embodiment, it is sufficient as long as there is an entity configured to retain an electric charge, and the capacitive element may be replaced with a capacitor if capacitance such as parasitic capacitance or the like can be used.

In the present embodiment, as an example, the writing transistor 23 and the supply switching transistor 24 are disclosed as p-channel transistors; however, they may be n-channel transistors. On the other hand, the correction transistor 25 and the anode switching transistor 26 are n-channel transistors.

The driving transistor 22 is serially connected to the organic EL element 21 via the anode switching transistor 26 and supplies a driving current to the organic EL element 21. Specifically, the drain electrode of the driving transistor 22 is connected to the anode electrode of the organic EL element 21 via the anode switching transistor 26.

The writing transistor 23 is connected at its gate electrode to the first scan line 211 (211-1 to 211-*m*), is connected at its source electrode to the signal line 310 (310-1 to 310-*n*), and is connected at its drain electrode to the source electrode of the driving transistor 22. The writing scan signal SEL is applied from the writing scan circuit 201 to the gate electrode of the writing transistor 23 via the first scan line 211 (211-1 to 211-*m*).

The supply switching transistor 24 is connected at its gate electrode to the second scan line 212 (212-1 to 212-*m*), is connected at its source electrode to a positive-side power-supply potential PVDD, which is an example of a first power supply, and is connected at its drain electrode to the source electrode of the driving transistor 22. The first emission drive signal SW1 is applied from the first emission drive scan circuit 202 to the gate electrode of the supply switching transistor 24 via the second scan line 212 (212-1 to 212-*m*).

The correction transistor 25 is connected at its gate electrode to the third scan line 213 (213-1 to 213-*m*), is connected at its source electrode to the gate electrode of the driving transistor 22, and is connected at its drain electrode to the drain electrode of the driving transistor 22. The correction control signal INI is applied from the correction control scan circuit 203 to the gate electrode of the correction transistor 25 via the third scan line 213 (213-1 to 213-*m*).

The anode switching transistor 26 is connected at its gate electrode to the fourth scan line 214 (214-1 to 214-*m*), is connected at its source electrode to the anode electrode of the organic EL element 21, and is connected at its drain electrode to the drain electrode of the driving transistor 22. The second emission drive signal SW2 is applied from the second emission drive scan circuit 204 to the gate electrode of the anode switching transistor 26 via the fourth scan line 214 (214-1 to 214-*m*).

The capacitive element 27 is connected between the gate electrode of the driving transistor 22 and the power-supply potential PVDD.

In the pixel 101 having the above configuration, the writing transistor 23 goes into a conductive state in response to the writing scan signal SEL applied from the writing scan circuit 201 to its gate electrode via the first scan line 211 (211-1 to 211-*m*). Due to this conduction, the writing transistor 23 samples the signal potential Vsig of an image signal depending on luminance information supplied from the signal output circuit 300 via the signal line 310, and writes it into the pixel 101. The written signal potential Vsig is applied to the source electrode of the driving transistor 22.

The driving transistor 22 receives current supply from the power-supply potential PVDD via the supply switching transistor 24 and drives light emission from the organic EL element 21 by means of current driving. More specifically, the driving transistor 22 supplies, to the organic EL element 21, a driving current whose value depends on a voltage value retained at the capacitive element 27, and causes the organic EL element 21 to emit light by performing current driving.

The supply switching transistor 24 goes into a conductive state in response to the first emission drive signal SW1 applied from the first emission drive scan circuit 202 to its gate electrode via the second scan line 212 (212-1 to 212-*m*). The anode switching transistor 26 goes into a conductive state in response to the second emission drive signal SW2 applied from the second emission drive scan circuit 204 to its gate electrode via the fourth scan line 214 (214-1 to 214-*m*). Bringing the supply switching transistor 24 and the anode switching transistor 26 into a conductive state enables the driving transistor 22 to drive light emission from the organic EL element 21 as described above. That is, each of the supply switching transistor 24 and the anode switching transistor 26 has a function of a transistor configured to control emission/non-emission of the organic EL element 21.

By performing switching operation of the supply switching transistor 24 and the anode switching transistor 26 in this way, it is possible to set a period during which the organic EL element 21 is in a non-emission state (non-emission period) and to control a ratio between an emission period and a non-emission period of the organic EL element 21. That is, so-called duty control may be performed. This duty control makes it possible to reduce an afterimage blur caused by light emission of the pixel 101 throughout one frame period and thus makes it possible to enhance the quality of an image, especially a moving image.

Next, with reference to a timing waveform diagram of FIG. 3 and an operation explanation diagram of FIGS. 4A-4F, circuit operation of the organic EL display device 10A according to the first embodiment, in which the pixels 101 each having the above configuration are arranged two-dimensionally in a matrix layout, will now be described.

Figure 3:
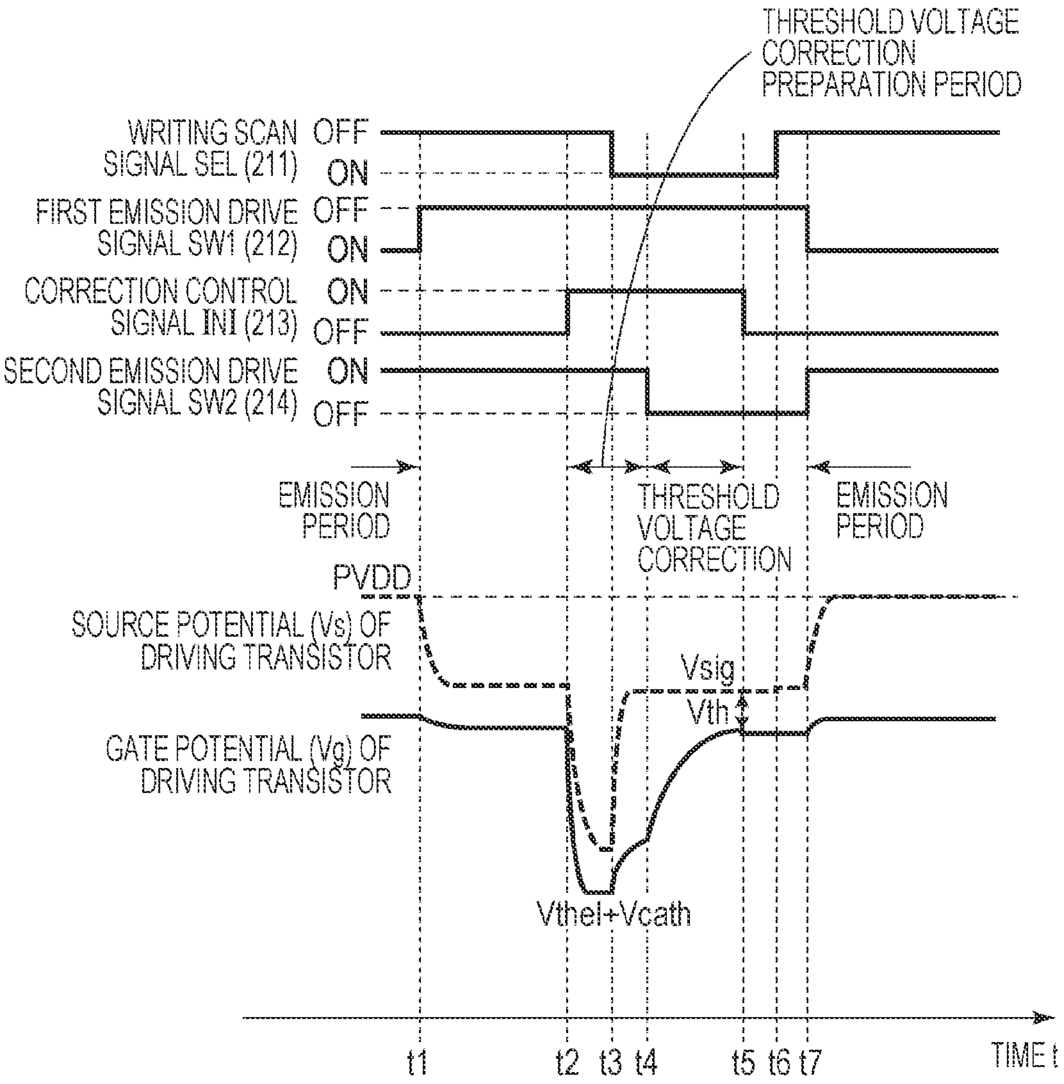
FIG. 3 is a timing waveform diagram of a pixel circuit according to the first embodiment.

The timing waveform diagram of FIG. 3 illustrates changes in the writing scan signal SEL supplied onto the first scan line 211, the first emission drive signal SW1 supplied onto the second scan line 212, the correction control signal INI supplied onto the third scan line 213, the second emission drive signal SW2 supplied onto the fourth scan line 214, and a source potential Vs and a gate potential Vg of the driving transistor 22. In the operation explanation diagram of FIGS. 4A-4F, except for the driving transistor 22, transistors are denoted by switch symbols, for simplified illustration.

In the timing waveform diagram of FIG. 3, the period before a point in time t1 is the emission period of the organic EL element 21 in the preceding frame (field). In this emission period in the preceding frame, since the first emission drive signal SW1 and the second emission drive signal SW2 are in an active state, the supply switching transistor 24 and the anode switching transistor 26 are in an ON (conductive) state. At this time, since the writing scan signal SEL and the correction control signal INI are in a non-active state, the writing transistor 23 and the correction transistor 25 are in an OFF (non-conductive) state.

Figures 4A, 4B, 4C, 4D, 4E, 4F:
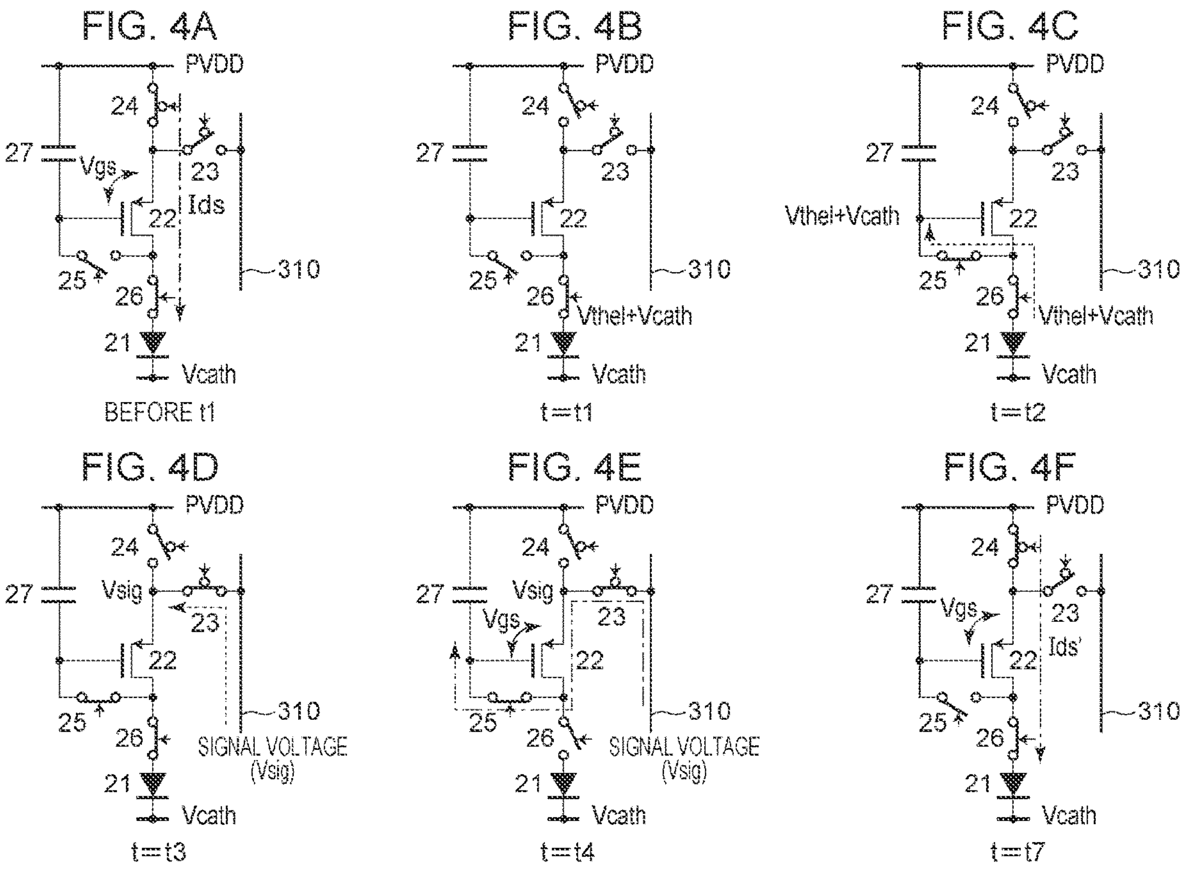
FIGS. 4A-4F are an operation explanation diagram for operation of the pixel circuit according to the first embodiment.

At this time, as illustrated in FIG. 4A, a driving current Ids depending on a gate-to-source voltage Vgs of the driving transistor 22 is supplied from the power-supply potential PVDD to the organic EL element 21 via the driving transistor 22. Therefore, the organic EL element 21 emits light at a luminance depending on the value of the driving current Ids.

A new frame (the current frame) of progressive scan begins at the point in time t1. Since the first emission drive signal SW1 turns into a non-active state, the supply switching transistor 24 turns into an OFF state as illustrated in FIG. 4B. Accordingly, the current supply from the power-supply potential PVDD to the organic EL element 21 via the driving transistor 22 stops. This turns off the organic EL element 21, and the non-emission period in the current frame begins.

Moreover, since the current supply to the organic EL element 21 stops, the anode potential of the organic EL element 21 converges to a level Vthel+Vcath, which is the sum of the threshold voltage Vthel and the cathode potential Vcath (potential of the common power supply line 35) of the organic EL element 21. At this time, the writing transistor 23 and the correction transistor 25 remain to be OFF, and the anode switching transistor 26 remains to be ON.

At a point in time t2 after a lapse of predetermined time since the point in time t1, since the correction control signal INI turns into an active state, the correction transistor 25 turns into an ON state, and a threshold voltage correction preparation period begins. Therefore, as illustrated in FIG. 4C, the gate and drain of the driving transistor 22 become conductive, and the anode voltage Vthel+Vcath of the organic EL element 21 is inputted into the gate electrode of the driving transistor 22 via the anode switching transistor 26 and the correction transistor 25, and its value is retained at the capacitive element 27.

As illustrated in FIG. 4D, at a point in time t3, since the writing scan signal SEL turns into an active state, the writing transistor 23 turns into an ON state. This brings the source level of the driving transistor 22 into Vsig, which is the signal-line potential. In order to perform threshold voltage correction operation to be described later properly, the value of the signal potential Vsig and the value of the cathode potential Vcath may be preferably set such that the gate-to-source voltage |Vsig−Vthel−Vcath| of the driving transistor 22 is greater than the threshold voltage |Vth| of the driving transistor 22. At this time, an electric current flows from the signal line 310 to the driving transistor 22 according to the gate-to-source voltage Vgs of the driving transistor 22, and the organic EL element 21 emits light. However, since this period is very short in relation to one frame period, the emission does not result in a decrease in display quality. A current path may be provided by using any other means so as to prevent this emission from occurring. Since an electric current flows to the driving transistor 22, the anode potential of the organic EL element 21 increases. The anode electrode of the organic EL element 21 and the gate electrode of the driving transistor 22 are connected to each other via the correction transistor 25 and the anode switching transistor 26; therefore, as the anode potential of the organic EL element 21 increases, so does the gate potential of the driving transistor 22.

Next, at a point in time t4, since the second emission drive signal SW2 switches from an active state into a non-active state, the anode switching transistor 26 turns into an OFF state. At this time, as illustrated in FIG. 4E, an electric current flows from the signal line 310 to the capacitive element 27 via the correction transistor 25. The path along which this current flows is indicated by a dot-and-dash-line arrow.

With this current flow, threshold voltage correction operation of changing the gate potential Vg of the driving transistor 22 is performed in a state in which the signal potential Vsig is inputted into the source electrode of the driving transistor 22. Changes in the gate potential Vg of the driving transistor 22 are illustrated in the timing waveform diagram of FIG. 3. Because of this threshold voltage correction operation, the gate potential Vg of the driving transistor 22 increases from Vthel+Vcath and, after a lapse of predetermined time, reaches a value of Vsig−|Vth|. At this time, the gate-to-source voltage Vgs of the driving transistor 22 is the threshold voltage |Vth| of the driving transistor 22.

The correction transistor 25 turns into an OFF state at a point in time t5. Next, the writing transistor 23 turns into an OFF state at a point in time t6 to end the writing of the signal potential Vsig. At a point in time t7 after a lapse of predetermined time, the supply switching transistor 24 and the anode switching transistor 26 turn into an ON state. This brings the source potential Vs of the driving transistor 22 to the same level as the power-supply potential PVDD. Since the gate potential Vg of the driving transistor 22 is retained by the capacitive element 27, if the value of the capacitive element 27 is sufficiently greater than parasitic capacitance that exists between the gate and source of the driving transistor 22, the gate potential Vg of the driving transistor 22 remains almost the same as the value of Vsig−|Vth|. At this time, the supply of an electric current from the power-supply potential PVDD to the driving transistor 22 is allowed, and, as illustrated in FIG. 4F, a current Ids' depending on the gate-to-source voltage Vgs of the driving transistor 22 is supplied to the organic EL element 21. The path along which this current flows is indicated by a two-dot-chain-line arrow. This turns on the organic EL element 21, and the emission period in the current frame begins. At this time, in order to reduce a voltage drop by the current Ids', the current driving performance of the anode switching transistor 26 may be preferably set to be greater than the current driving performance of the correction transistor 25.

"The current driving performance of the anode switching transistor 26 is greater than the current driving performance of the correction transistor 25" may mean that, for example, the channel width of the anode switching transistor 26 is greater than the channel width of the correction transistor 25. The gate length of the anode switching transistor 26 may be set to be less than the gate length of the correction transistor 25. The thickness of the insulating film in the channel region of the anode switching transistor 26 may be set to be less than the thickness of the insulating film in the channel region of the correction transistor 25. Since the thickness of the insulating film could have an influence on a leakage current, the thickness of the insulating film of the former may be set to be the same as the thickness of the insulating film of the latter, except for manufacturing errors, with the current driving performance increased by any other means. That is, the channel width of the anode switching transistor 26 may be set to be greater than the channel width of the correction transistor 25, with the thickness of the insulating film in the channel region of the anode switching transistor 26 set to be equal to the thickness of the insulating film in the channel region of the correction transistor 25. Alternatively, the gate length of the anode switching transistor 26 may be set to be less than the gate length of the correction transistor 25, with the thickness of the insulating film in the channel region of the anode switching transistor 26 set to be equal to the thickness of the insulating film in the channel region of the correction transistor 25.

As explained above, with the display device 10A according to the first embodiment, by performing the threshold voltage correction operation, it is possible to correct variation in the threshold voltage of the driving transistor 22 and to reduce a decrease in image quality such as unevenness, streaks, and/or roughness caused due to current variation of the driving transistor 22.

In the present embodiment, the writing transistor 23 and the supply switching transistor 24 are configured as p-channel transistors, and the correction transistor 25 and the anode switching transistor 26 are configured as n-channel transistors. Compared with a case where all of the transistors are configured as p-channel transistors, this configuration makes it possible to reduce the voltage amplitude of scan lines for controlling transistors that constitute a pixel.

The reason is as follows. A first voltage inputted into a pixel and applied to each scan line, and a second voltage that is lower than the first voltage, are estimated on the basis of the potential for turning each transistor ON and the potential for turning each transistor OFF. The first voltage may be referred to as "high-side voltage", and the second voltage may be referred to as "low-side voltage".

The first voltage is determined on the basis of, for example, the potential for turning the writing transistor 23 and the supply switching transistor 24 OFF. On the other hand, in a case where the correction transistor 25 and the anode switching transistor 26 are configured as p-channel transistors, the second voltage is determined on the basis of the ON voltage of the correction transistor 25 and the anode switching transistor 26. This ON voltage may be preferably set in consideration of the threshold voltage of the correction transistor 25 and the anode switching transistor 26 so as to input the anode potential of the organic EL element 21 to the gate electrode of the driving transistor 22 in the threshold voltage correction preparation period. Specifically, if the threshold voltage of the correction transistor 25 and the anode switching transistor 26 is defined as |Vths|, the second voltage may be preferably set to be not greater than Vthel+Vcath−|Vths|.

On the other hand, in a case where the correction transistor 25 and the anode switching transistor 26 are configured as n-channel transistors, the second voltage is determined on the basis of the OFF voltage of the correction transistor 25 and the anode switching transistor 26. In this case, by using the threshold voltage |Vths| mentioned above, the second voltage suffices to be set to be not greater than Vthel+Vcath+|Vths|. Therefore, configuring the correction transistor 25 and the anode switching transistor 26 as n-channel transistors makes it possible to set the second voltage higher and thus to reduce the amplitude of the scan lines. Consequently, it is possible to reduce driving power.

The n-channel transistor(s) of the display device according to one embodiment of the present disclosure may be preferably an oxide semiconductor. For example, the n-channel transistors are the correction transistor 25 and the anode switching transistor 26. A source-to-drain leakage current of an oxide semiconductor during OFF is very small; therefore, when the correction transistor 25 is an oxide semiconductor, it is possible to significantly reduce a leakage current flowing between the gate and drain of the driving transistor 22 during an emission period. Therefore, changes in the gate potential of the driving transistor 22 during an emission period are small and, accordingly, changes in an electric current flowing to the organic EL element 21 and its emission luminance are small. Consequently, it is possible to reduce image-quality problems such as flickers and surface roughness caused due to changes in luminance during an emission period at the time of low-refresh-rate operation.

When the correction transistor 25 and the anode switching transistor 26 are oxide semiconductors, it is possible to achieve a further current leakage reduction. After a p-channel transistor is formed, an oxide semiconductor layer may be formed on top of it. Since this makes it possible to stack the transistors in layers, high definition is achieved in addition to the effects described above. That is, an active region of a p-channel transistor and an active region of an n-channel transistor may overlap in a plan view. The p-channel transistor may be formed after the n-channel transistor is formed first. The n-channel transistor may be a transistor that includes an oxide semiconductor in its active region.

Figure 5:
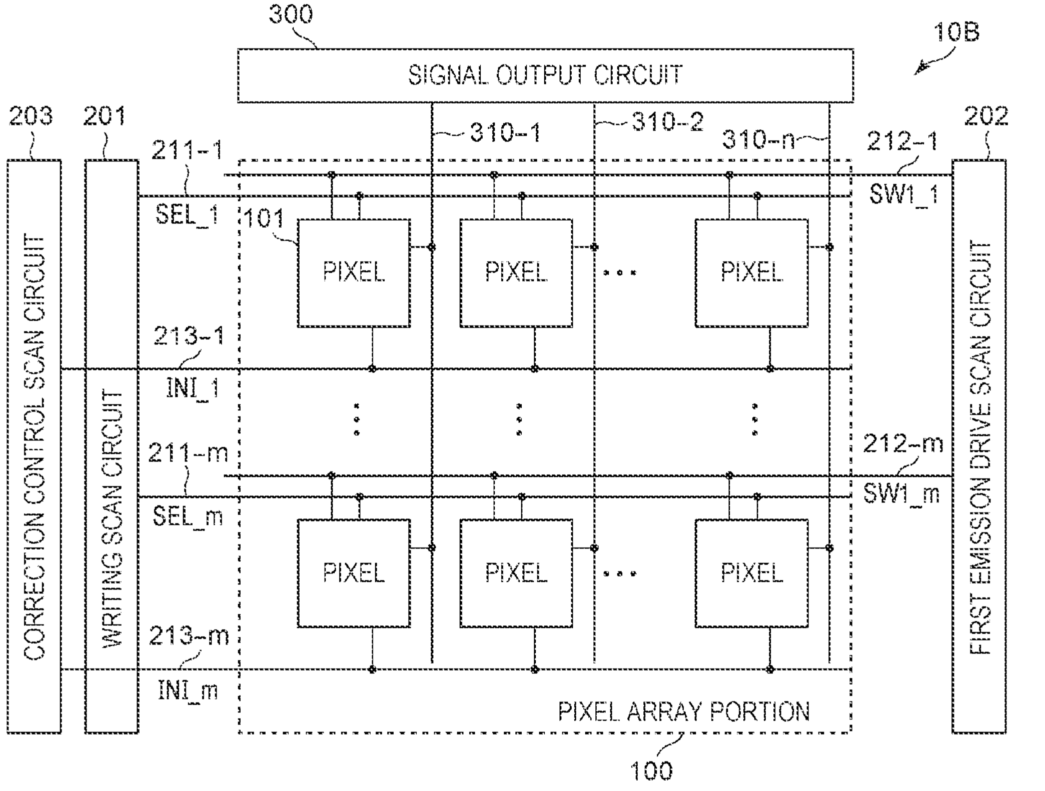
FIG. 5 is a system configuration diagram schematically illustrating a configuration of an active-matrix display device according to the first embodiment.
Figure 6:
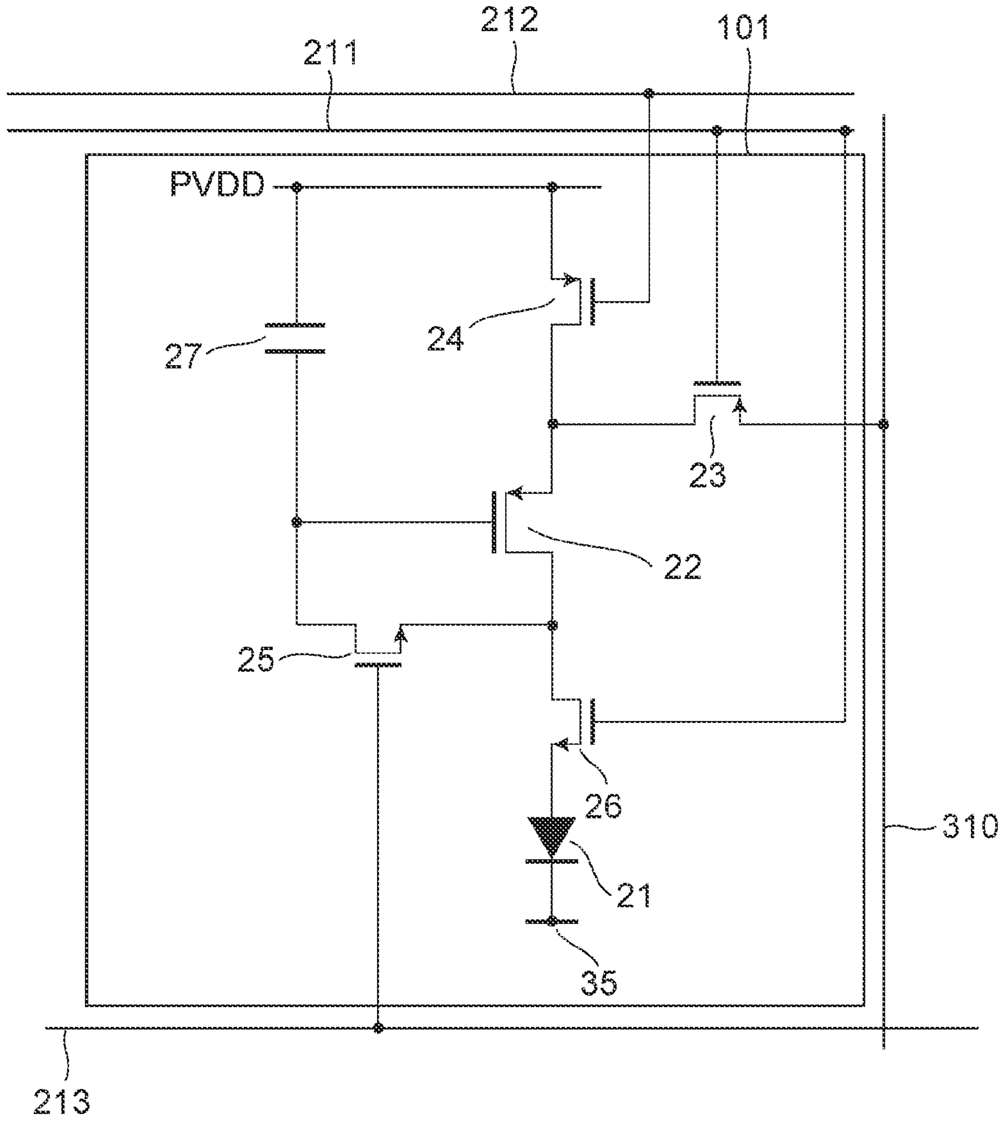
FIG. 6 is an example of a circuit diagram of a pixel according to the first embodiment.

FIG. 5 is an example of a schematic view illustrating a display device 10B according to one embodiment of the present disclosure. FIG. 6 illustrates a specific example of the configuration of the pixel 101 used in the organic EL display device 10B according to the present embodiment. In the drawings, the same reference signs are assigned to the same components as those of FIGS. 1 and 2 or similar thereto.

In the present embodiment, the control line connected to the gate electrode of the writing transistor is connected to the gate electrode of the anode switching transistor. Specifically, in the configuration illustrated in FIGS. 5 and 6, the gate electrode of the anode switching transistor 26 is connected to the first scan line 211 (211-1 to 211-*m*). The second emission drive scan circuit 204 illustrated in FIG. 1 is omitted. This configuration achieves a reduction in peripheral circuitry and thus realizes a narrow casing trim.

Figure 7:
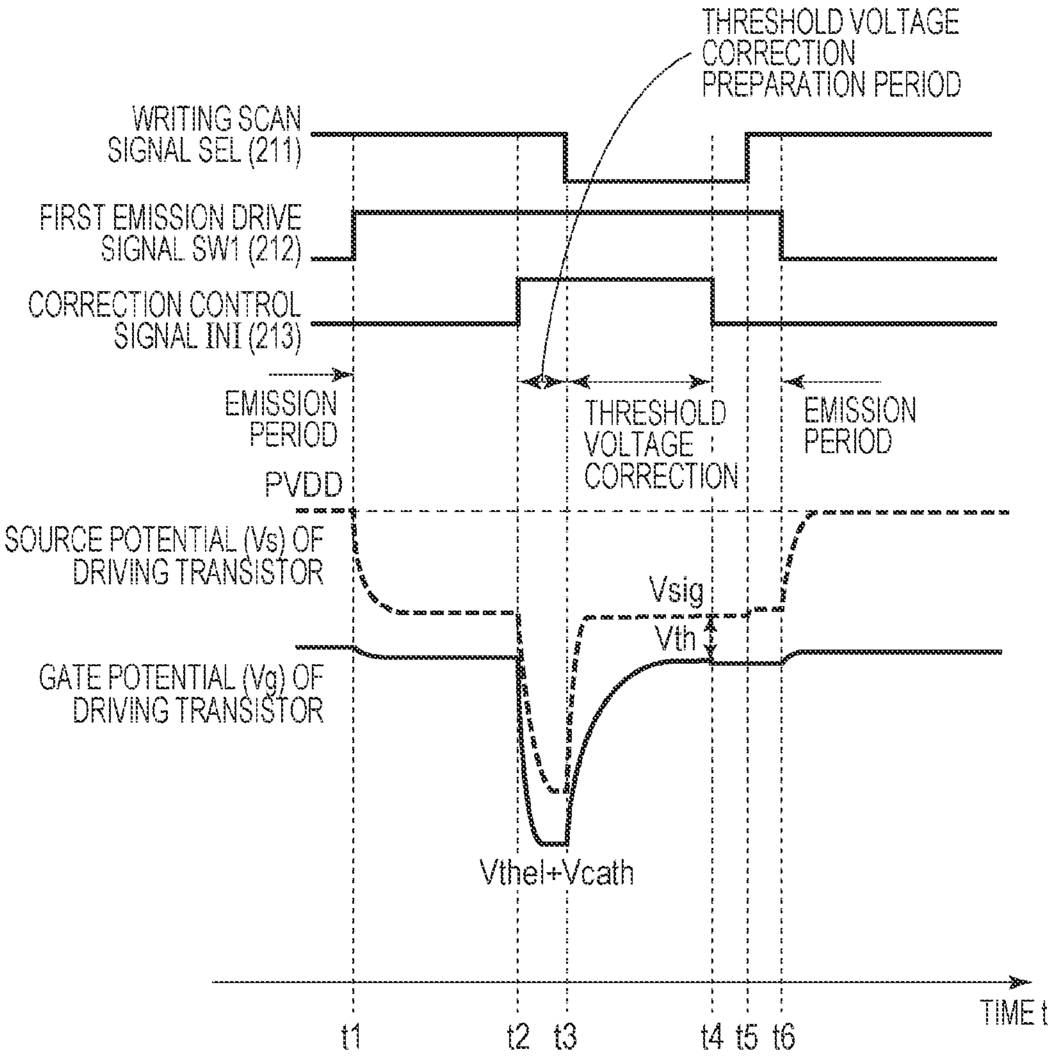
FIG. 7 is a timing waveform diagram of a pixel circuit according to the first embodiment.

FIG. 7 illustrates timing waveforms for circuit operation of the organic EL display device 10B according to the present embodiment. The timing waveform diagram of FIG. 7 illustrates changes in the writing scan signal SEL supplied onto the first scan line 211, the first emission drive signal SW1 supplied onto the second scan line 212, the correction control signal INI supplied onto the third scan line 213, and the source potential Vs and the gate potential Vg of the driving transistor 22.

In the present embodiment, similarly to the writing transistor 23, the anode switching transistor 26 responds to the writing scan signal SEL applied from the writing scan circuit 201 to its gate electrode via the first scan line 211 (211-1 to 211-*m*) as described earlier. When the writing transistor is in an ON state, the anode switching transistor 26 is in an OFF state because the anode switching transistor 26 is an n-channel transistor. That is, the ON/OFF state of the anode switching transistor and the ON/OFF state of the writing transistor are the opposite of each other. That is, when the anode switching transistor 26 is in an ON state, the writing transistor 23 is in an OFF state.

According to the timing waveform diagram of FIG. 7, threshold voltage correction operation is performed upon a change in voltage level of the writing scan signal SEL from High to Low at the point in time t3. This voltage change puts the writing transistor 23 into an ON state and puts the anode switching transistor 26 into an OFF state. Therefore, as illustrated in FIG. 4E described earlier, an electric current flows from the signal line 310 to the capacitive element 27, and threshold voltage correction operation of bringing the gate potential of the driving transistor 22 closer to the source potential thereof is performed.

Also in the present embodiment, by performing the threshold voltage correction operation, it is possible to correct variation in the threshold voltage of the driving transistor 22 and to reduce unevenness and/or roughness caused due to current variation of the driving transistor 22. Furthermore, since it is possible to reduce peripheral circuitry as described earlier, a narrow casing trim is realized.

Moreover, also in the present embodiment, it is possible to reduce the amplitude of a control signal supplied to the gate of each transistor and, therefore, low power consumption is achieved. Moreover, configuring the correction transistor 25 as an oxide semiconductor makes it possible to reduce a change in luminance during an emission period. After a p-channel transistor is formed, an oxide semiconductor layer may be formed on top of it. Since this makes it possible to stack the transistors in layers, high definition is achieved in addition to the effects described above. That is, an active region of a p-channel transistor and an active region of an n-channel transistor may overlap in a plan view. The p-channel transistor may be formed after the n-channel transistor is formed first.

Though the writing scan circuit 201 and the correction control scan circuit 203 are provided separately from each other in FIG. 5, for example, the correction control scan circuit 203 may be omitted in FIG. 5, and the correction control signal INI may be outputted from the writing scan circuit 201. More specifically, by configuring the writing scan circuit 201 in such a way as to have an odd number of buffers between a correction control signal INI_n of an N-th row and a writing scan signal SEL_n of the N-th row, as illustrated in the timing chart of FIG. 3 and the timing chart of FIG. 7, it is possible to configure the writing scan signal SEL as a pulse with a phase delay the phase of which is the opposite of the phase of the correction control signal INI. Consequently, it is possible to reduce the number of peripheral circuits and thus realize a narrow casing trim.

Second Embodiment

Figure 8:
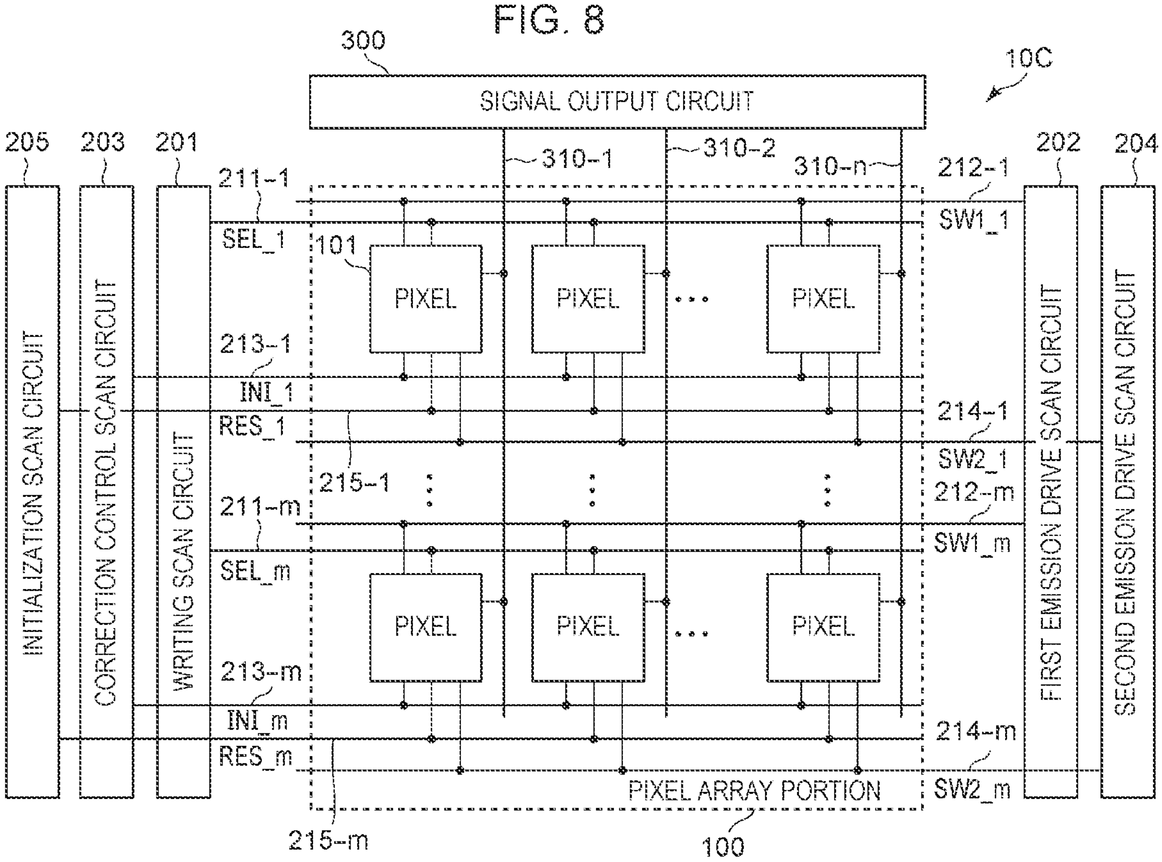
FIG. 8 is a system configuration diagram schematically illustrating a configuration of an active-matrix display device according to a second embodiment.
Figure 9:
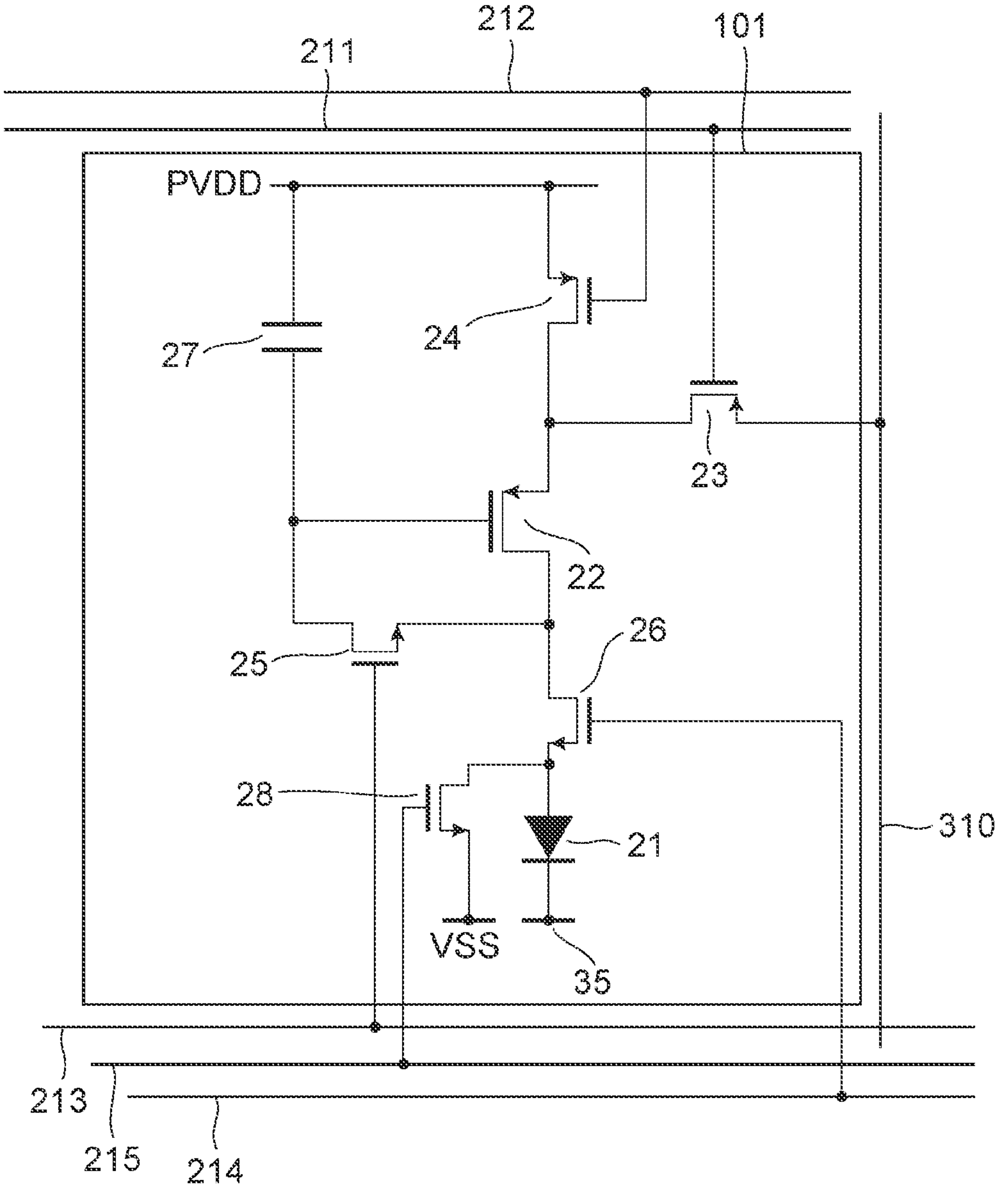
FIG. 9 is an example of a circuit diagram of a pixel according to the second embodiment.
Figure 10:
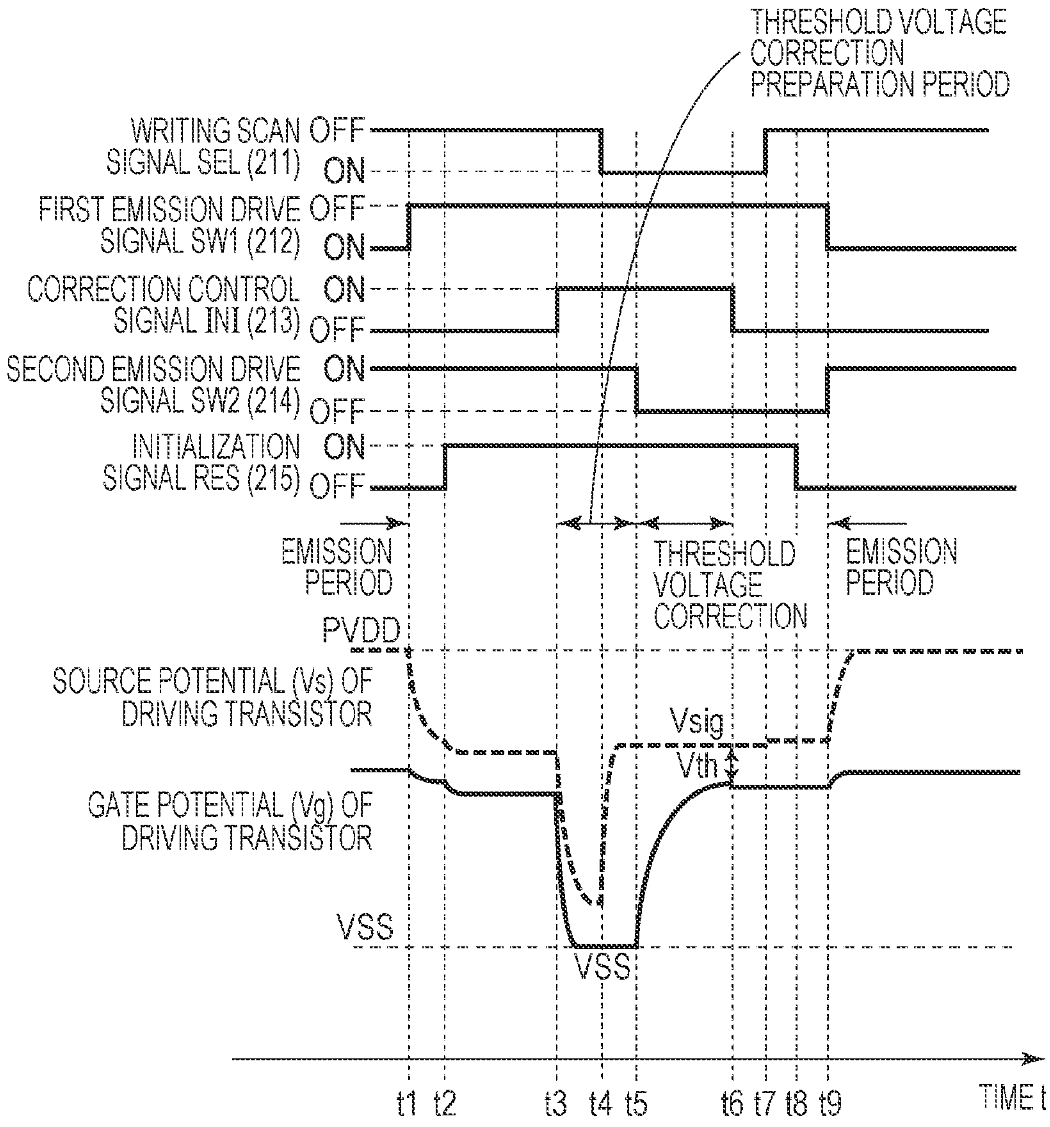
FIG. 10 is a timing waveform diagram of a pixel circuit according to the second embodiment.

FIG. 8 is a schematic view illustrating an example of an active-matrix display device 10C according to a second embodiment. The second embodiment discloses a display device that achieves a driving power reduction in addition to a leakage current reduction. FIG. 9 is a circuit diagram illustrating a specific example of the configuration of the pixel 101 of the organic EL display device 10C according to the present embodiment. FIG. 10 illustrates an example of timing waveforms for circuit operation of the organic EL display device 10C according to the present embodiment. In the drawings, the same reference signs are assigned to the same components as those of FIGS. 1, 2, and 3 or similar thereto.

The description below will be given while taking as an example an active-matrix organic EL display device using, as a light-emitting element of its pixel, a current-driven electro-optical element whose emission luminance changes in accordance with an amount of an electric current that flows, for example, an organic EL element.

FIG. 8 is a conceptual diagram of the display device 10C according to the present embodiment. An initialization scan circuit 205 is provided as a difference from the first embodiment. A fifth scan line 215-1 to 215-*m* is provided for each pixel row and extends in a row direction in such a way as to correspond to the matrix layout of the pixels 101 arranged in m rows and n columns.

The initialization scan circuit 205 is configured as a shift register that shifts a start pulse (not illustrated) sequentially in synchronization with a clock pulse (not illustrated). In synchronization with the progressive scan performed by the writing scan circuit 201, the initialization scan circuit 205 supplies, to the fifth scan line (initialization scan line) 215-1 to 215-*m*, an initialization signal RES (RES_1 to RES_m) for performing initialization operation of the anode electrode of the organic EL element 21 in the pixel 101. The initialization signal RES is used for controlling the initialization of the anode potential of the organic EL element 21 in the pixel 101.

The pixel circuit configured to drive the organic EL element 21 illustrated in FIG. 9 includes the driving transistor 22, the writing transistor 23, the supply switching transistor 24, the correction transistor 25, the anode switching transistor 26, the capacitive element 27, and an initialization transistor 28. In the pixel circuit illustrated in FIG. 9, p-channel transistors are used for the driving transistor 22, the writing transistor 23, and the supply switching transistor 24, and n-channel transistors are used for the correction transistor 25, the anode switching transistor 26, and the initialization transistor 28.

The initialization transistor 28 is connected at its gate electrode to the fifth scan line 215 (215-1 to 215-*m*), is connected at its source electrode to a power-supply potential VSS, and is connected at its drain electrode to the anode electrode of the organic EL element 21. Let Vthel be the threshold voltage of the organic EL element 21. Let Vcath be the cathode potential of the organic EL element 21 (potential of the common power supply line 35). Given these definitions, the power-supply potential VSS is set in such a way as to satisfy the following condition: $VSS<Vthel+Vcath$. By this means, it is possible to set the anode potential of the organic EL element 21 at a level at which the organic EL element 21 does not emit light when the initialization transistor 28 is in an ON state. Though a case where the value of the power-supply potential VSS is different from the value of the cathode potential Vcath of the organic EL element 21 is assumed here, they may be the same value. It can be said that adopting a configuration in which the value of the power-supply potential VSS is the same as the value of the cathode potential Vcath of the organic EL element 21 is advantageous in terms of a reduction in the number of wiring lines because this configuration makes it unnecessary to provide a power-supply wiring line of the power-supply potential VSS provided individually in each pixel.

The initialization transistor 28 turns into an ON state before the threshold voltage correction preparation period, thereby writing the power-supply potential VSS into the anode electrode of the organic EL element 21. Since this operation brings the anode potential of the organic EL element 21 to VSS during the threshold voltage correction preparation period, an electric current does not flow to the organic EL element 21 during this period, and a so-called "fading of a black color" phenomenon does not occur in black display. Consequently, it is possible to obtain a good contrast.

In the present embodiment, the anode switching transistor 26, the correction transistor 25, and the initialization transistor 28 are configured as n-channel transistors. This makes it possible to reduce the amplitude of a control signal for controlling a transistor included in a pixel and thus achieve low power consumption, similarly to the first embodiment.

The n-channel transistor(s) according to the present embodiment, similarly to the first embodiment, may be preferably an oxide semiconductor. After a p-channel transistor is formed, an oxide semiconductor layer may be formed on top of it. Since this makes it possible to stack the transistors in layers, high definition is achieved in addition to the effects described above. That is, an active region of a p-channel transistor and an active region of an n-channel transistor may overlap in a plan view. The p-channel transistor may be formed after the n-channel transistor is formed first.

As explained above, in the organic EL display device 10C according to the second embodiment, one additional transistor is provided, and, in accordance with this increase in the number of transistors, one additional scan line and one additional scan circuit are provided: however, similarly to the first embodiment, effects of low power consumption, high image quality, and high contrast can be obtained in addition to operational effects obtained by having a threshold voltage correction function.

Figure 11:
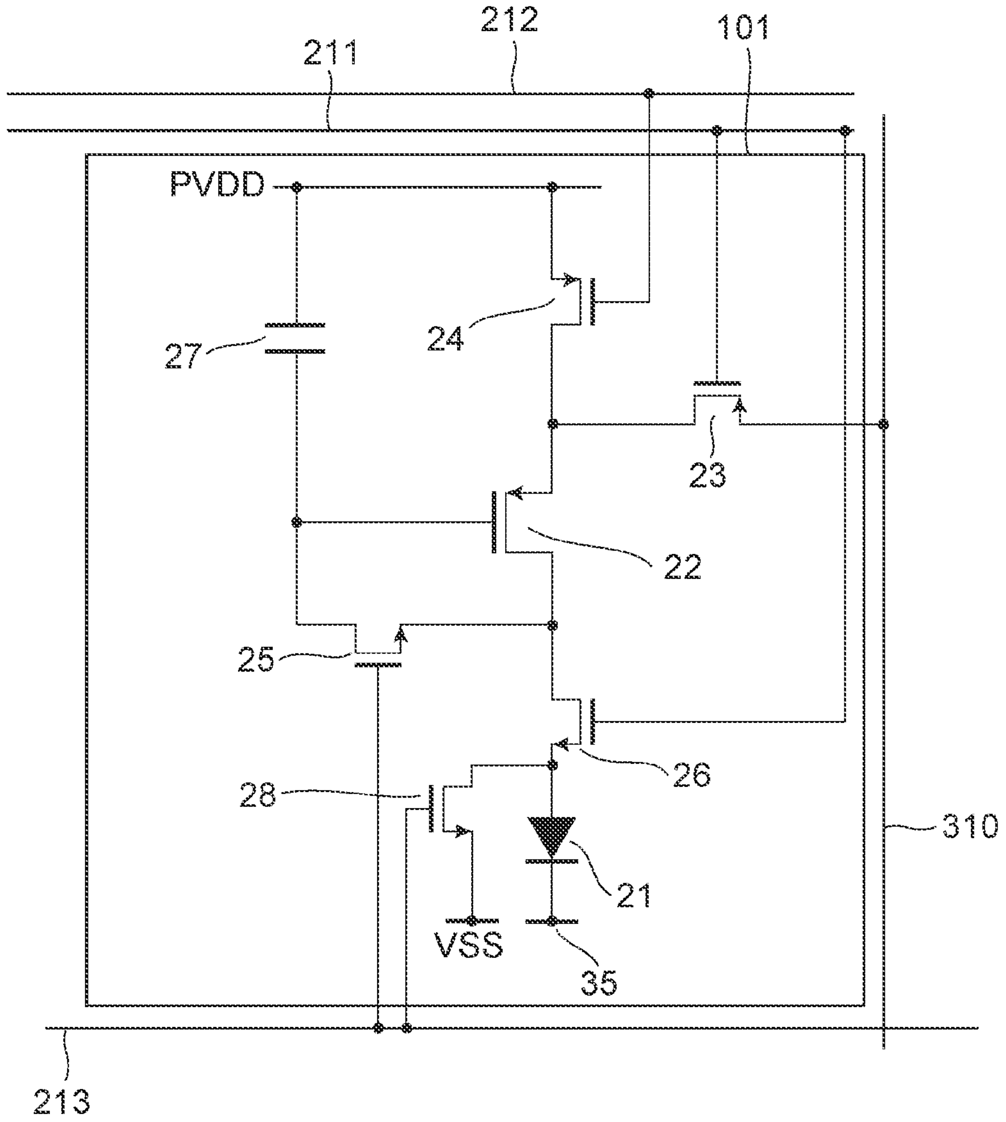
FIG. 11 is an example of a circuit diagram of a pixel according to the second embodiment.

FIG. 11 is a circuit diagram illustrating another example of the configuration of the pixel 101 of the display device according to the present embodiment. The schematic view of the display device is the same as that of FIG. 5. In the drawings, the same reference signs are assigned to the same components as those of FIG. 9 or similar thereto. In the present embodiment, the control line connected to the gate electrode of the correction transistor is connected to the gate electrode of the initialization transistor 28. That is, the gate electrode of the anode switching transistor 26 is connected to the first scan line 211 (211-1 to 211-*m*), and the gate electrode of the initialization transistor 28 is connected to the third scan line 213 (213-1 to 213-*m*). In this configuration, the gate electrode of the anode switching transistor 26 is connected to the gate electrode of the writing transistor 23, and the gate electrode of the initialization transistor 28 is connected to the gate electrode of the correction transistor 25; however, this configuration is just an example. For example, the above-mentioned gate-to-gate connection may be only between the anode switching transistor 26 and the writing transistor 23, and the second emission drive scan circuit 204 only may be eliminated. Alternatively, the above-mentioned gate-to-gate connection may be only between the initialization transistor 28 and the correction transistor 25, and the initialization scan circuit 205 only may be eliminated. Since the second emission drive scan circuit 204 and the initialization scan circuit 205 illustrated in FIG. 8 are eliminated, this configuration achieves a reduction in peripheral circuitry and thus realizes a narrow casing trim.

Figure 12:
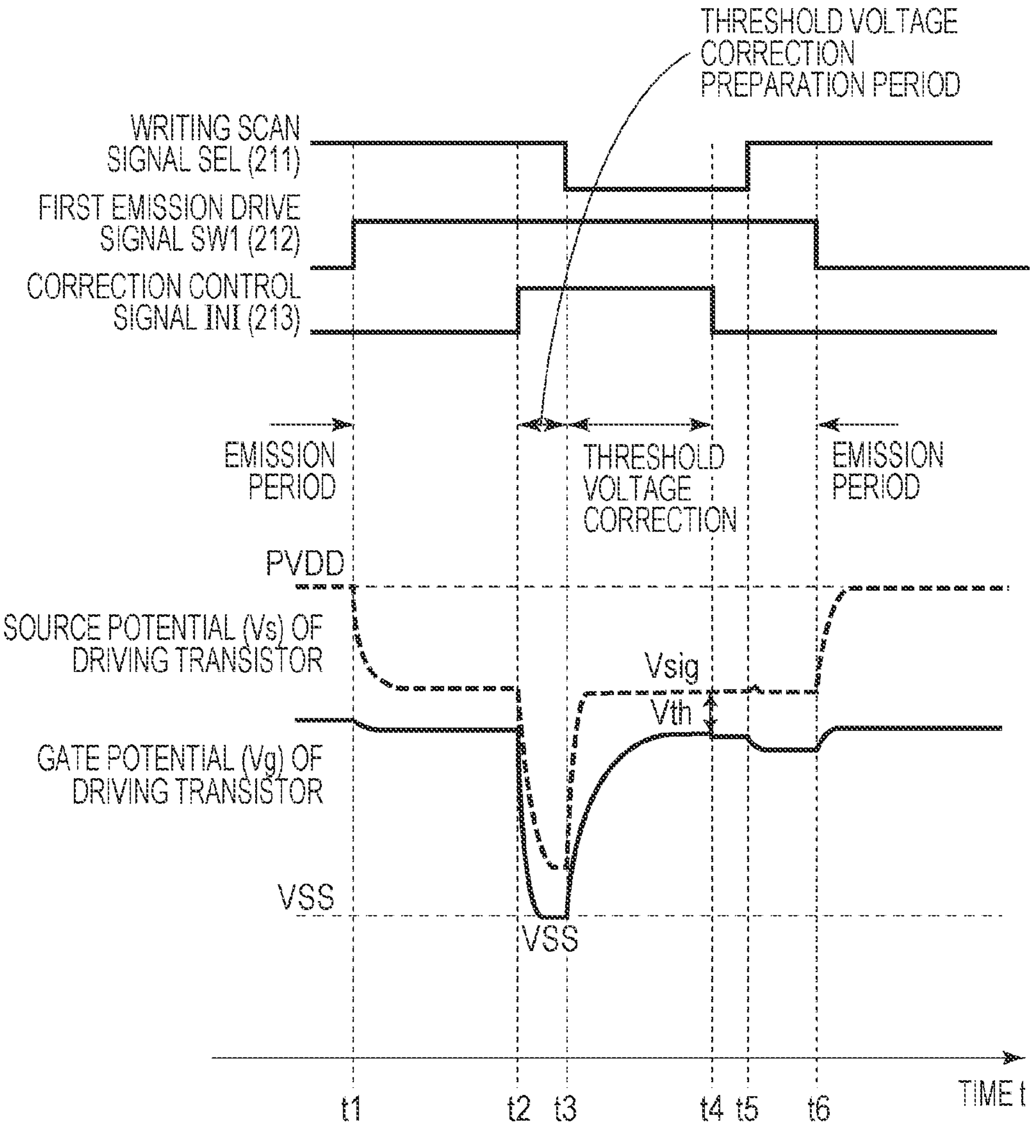
FIG. 12 is a timing waveform diagram of a pixel circuit according to the second embodiment.

FIG. 12 illustrates timing waveforms for circuit operation of an organic EL display device according to the present embodiment. The timing waveform diagram of FIG. 12 illustrates changes in the writing scan signal SEL supplied onto the first scan line 211, the first emission drive signal SW1 supplied onto the second scan line 212, the correction control signal INI supplied onto the third scan line 213, and the source potential Vs and the gate potential Vg of the driving transistor 22.

In the present embodiment, similarly to the writing transistor 23, the anode switching transistor 26 responds to the writing scan signal SEL applied from the writing scan circuit 201 to its gate electrode via the first scan line 211 (211-1 to 211-*m*) as described earlier, thereby turning into an ON state. On the other hand, the anode switching transistor 26 is an n-channel transistor and is therefore in an OFF state. That is, the ON/OFF state of the anode switching transistor and the ON/OFF state of the writing transistor are the opposite of each other. That is, when the anode switching transistor 26 is in an ON state, the writing transistor 23 is in an OFF state.

Since the initialization transistor 28 and the correction transistor 25 are both n-channel transistors, they respond to the correction control signal INI applied from the correction control scan circuit 203 to their gate electrodes via the third scan line 213 (213-1 to 213-*m*), thereby turning into a conductive/non-conductive state.

According to the timing waveform diagram of FIG. 12, threshold voltage correction operation is performed upon a change in voltage level of the writing scan signal SEL from High to Low at the point in time t3. Due to this voltage change of the control line, the writing transistor 23 turns into an ON state, and the anode switching transistor 26 turns into an OFF state; therefore, as illustrated in FIG. 4E described earlier, an electric current flows from the signal line 310 to the capacitive element 27, and threshold voltage correction operation of bringing the gate potential of the driving transistor 22 closer to the source potential thereof is performed.

Also in the present embodiment, by performing the threshold voltage correction operation, it is possible to correct variation in the threshold voltage of the driving transistor 22 and to reduce image-quality problems such as unevenness and/or roughness caused due to current variation of the driving transistor 22. Furthermore, since it is possible to reduce peripheral circuitry as described earlier, a narrow casing trim is realized.

Also in the present embodiment, it is possible to reduce the amplitude of a control signal supplied to the gate of each transistor and, therefore, low power consumption is achieved. Configuring the correction transistor 25, which is an n-channel transistor, as an oxide semiconductor makes it possible to reduce a change in luminance during an emission period.

Though the gate electrode of the initialization transistor 28 is connected to the third scan line 213 (213-1 to 213-*m*) in the circuit diagram of FIG. 11, it may be connected to the second scan line 212 (212-1 to 212-*m*). When configured in this way, the initialization transistor 28 turns ON during a non-emission period, that is, a period in which the supply switching transistor 24 is OFF, and VSS is applied to the anode electrode of the organic EL element 21. For this reason, the organic EL element 21 does not emit light during a non-emission period and, therefore, a so-called "fading of a black color" phenomenon does not occur in black display. Consequently, it is possible to obtain a good contrast.

Also in the present embodiment, similarly to the first embodiment, for example, the correction control scan circuit 203 may be omitted, and the correction control signal INI may be outputted from the writing scan circuit 201. More specifically, by configuring the writing scan circuit 201 in such a way as to have an odd number of buffers between a correction control signal INI_n of an N-th row and a writing scan signal SEL_n of the N-th row, as illustrated in the timing chart of FIG. 3 and the timing chart of FIG. 7, it is possible to configure the writing scan signal SEL as a pulse with a phase delay the phase of which is the opposite of the phase of the correction control signal INI. Consequently, it is possible to reduce the number of peripheral circuits and thus realize a narrow casing trim.

Figure 13:
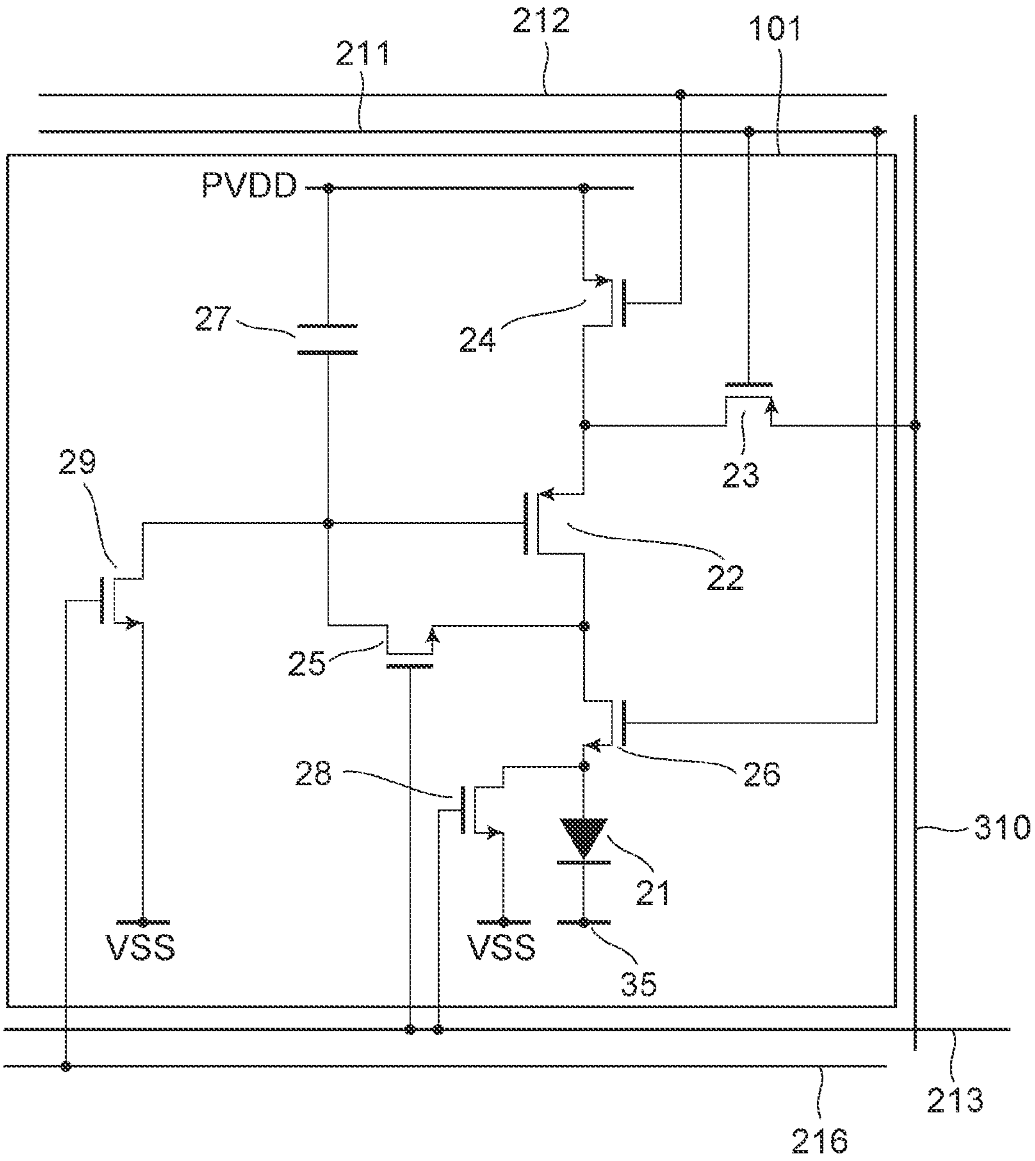
FIG. 13 is an example of a circuit diagram of a pixel according to the second embodiment.

In the pixel 101, as illustrated in FIG. 13, a gate initialization transistor 29 may be connected between the gate of the driving transistor 22 and the power-supply potential VSS. The gate initialization transistor may be preferably an n-channel transistor and may, more preferably, include an oxide semiconductor. In FIG. 13, the gate initialization transistor 29 is connected to the power-supply potential VSS; however, this is just an example, the connection destination may be another power supply VSS2, which is not VSS.

In FIG. 13, a gate initialization scan signal RESG is applied via a sixth scan line 216 (216-1 to 216-*m*) to the gate electrode of the gate initialization transistor 29 from a gate initialization scan circuit (not illustrated) provided near the pixel array portion 100.

Figure 14:
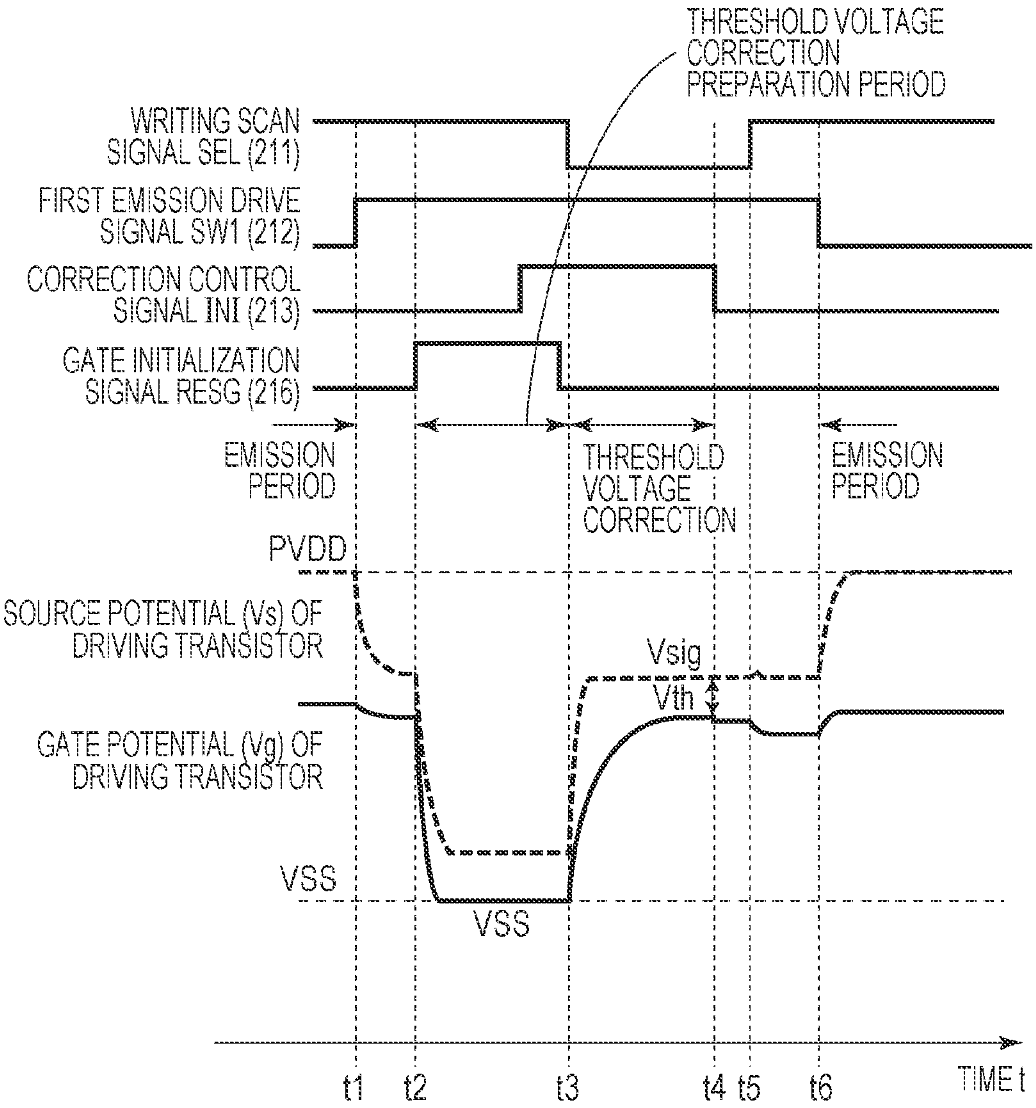
FIG. 14 is a timing waveform diagram of a pixel circuit according to the second embodiment.

FIG. 14 is a timing waveform diagram of the pixel circuit illustrated in FIG. 13. According to the timing waveform diagram of FIG. 14, the gate initialization transistor 29 turns into an ON state at the point in time t2, the power-supply potential VSS is written into the gate electrode of the driving transistor 22, and the threshold voltage correction preparation period begins. In the present embodiment, it is possible to determine the start of the threshold voltage correction preparation period on the basis of the gate initialization scan signal RESG. Therefore, as compared with the timing illustrated in FIG. 12, it is possible to set the threshold voltage correction preparation period longer. Consequently, it is possible to perform threshold voltage correction operation in a state in which the power-supply potential VSS is written to the gate potential of the driving transistor 22 and thus to reduce a decrease in image quality such as unevenness, roughness, and/or shading caused due to insufficient writing of the power-supply potential VSS.

Moreover, also in the present embodiment, it is possible to reduce the amplitude of a control signal supplied to the gate of each transistor and, therefore, low power consumption is achieved. Similarly to the other embodiments, an active region of a p-channel transistor and an active region of an n-channel transistor can be configured to overlap in a plan view. Since this makes it possible to stack the transistors in layers, high definition is also achieved.

Other Embodiments

A display device according to one embodiment of the present disclosure may have the following configuration. The display device may include a pixel circuit. The pixel circuit may include: a current-driven electro-optical element; a first power supply from which a current is supplied to the electro-optical element; a third power supply which is lower in potential than the first power supply; a signal line via which an image signal is supplied to the electro-optical element; a writing transistor whose first terminal is coupled to the signal line; a driving transistor whose first terminal is coupled to a second terminal of the writing transistor, the driving transistor being configured to drive the electro-optical element in accordance with an image signal written by the writing transistor; a correction transistor coupled between a gate of the driving transistor and a second terminal of the driving transistor; a anode switching transistor coupled between the second terminal of the driving transistor and the anode of the electro-optical element; and a capacitive element coupled between the gate of the driving transistor and the first power supply.

The cathode of the electro-optical element may be coupled to the third power supply. Every transistor disposed on at least one current path leading from the capacitive element to a power supply which is lower in potential than the first power supply may be an n-channel transistor. Similarly to other embodiments, the n-channel transistor may preferably include an oxide semiconductor. An n-channel transistor, because its leakage current is smaller than that of a p-channel transistor, is preferable in terms of a small leakage current from a capacitive element.

In FIG. 13, PVDD is an example of a first power supply, and VSS is an example of a third power supply. The potential of the common power supply line may be equal to that of VSS. That is, the potential of the common power supply line may be regarded as the third power supply.

An example of a current path leading from the capacitive element to a power supply which is lower in potential than the first power supply, that is, to the third power supply, is a path from the capacitive element 27 to the correction transistor 25, the second switching transistor 26, and the organic EL element 21 in the present embodiment. Another example of a current path leading from the capacitive element to the third power supply is a path from the capacitive element 27 to the correction transistor 25, the second switching transistor 26, and the initialization transistor 28. Another example of a current path leading from the capacitive element to the third power supply is a path from the capacitive element 27 to the gate initialization transistor 29.

Every transistor disposed on at least any of these current paths may be preferably an n-channel transistor, preferably, a transistor including an oxide semiconductor. Every transistor disposed on all of these current paths may be preferably an n-channel transistor, preferably, a transistor including an oxide semiconductor. This is because a leakage current from the capacitive element can be reduced as described above.

Structure of Organic EL Element

An organic EL element is provided by forming an insulating layer, a first electrode, an organic compound layer, and a second electrode on a substrate. A protective layer, a color filter, a microlens, and the like may be formed on the cathode. When a color filter is provided, a planarization layer may be provided between the color filter and the protective layer. The planarization layer can be formed by using an acrylic resin or the like. The same applies to a case where a planarization layer is provided between a color filter and a microlens.

Substrate

Examples of a substrate include quartz, glass, a silicon wafer, a resin, and a metal. Switching elements such as transistors and wiring lines may be disposed on the substrate, and an insulating layer may be disposed thereon. The material of the insulating layer is not limited. Any material may be used as long as contact holes can be formed such that wiring lines to the first electrode can be formed, and insulation from wiring lines that are not connected thereto can be secured. For example, resins such as polyimide, silicon oxide, or silicon nitride can be used.

Electrode

A pair of electrodes may be used. The pair of electrodes may be the anode and the cathode. When an electric field is applied in a direction in which the organic EL element emits light, the electrode with a higher potential is the anode, and the other electrode is the cathode. To put it another way, the electrode that supplies holes to the light emission layer is the anode, and the electrode that supplies electrons thereto is the cathode.

It is advantageous to use a material with a work function that is as large as possible as the material of the anode. For example, the following material can be used: single metals such as gold, platinum, silver, copper, nickel, palladium, cobalt, selenium, vanadium, and tungsten, mixtures thereof, and alloys thereof; and metal oxides such as tin oxide, zinc oxide, indium oxide, indium tin oxide (ITO), and indium zinc oxide. Conductive polymers such as polyaniline, polypyrrole, and polythiophene can also be used.

These electrode substances may be used alone, or two or more of them may be used in combination. The anode may be constituted by a single layer or multiple layers.

For use as a reflection electrode, for example, chromium, aluminum, silver, titanium, tungsten, molybdenum, an alloy thereof, or a layered product thereof can be used. The material enumerated above may function as a reflection film without an electrode function. For use as a transparent electrode, a transparent conductive layer made of an oxide such as indium tin oxide (ITO) or indium zinc oxide can be used, but is not limited thereto. Photolithography can be employed for forming electrodes.

By contrast, it is advantageous to use a material with a work function that is as small as possible as the material of the cathode. Examples of such a material include: alkali metals such as lithium, alkaline earth metals such as calcium, single metals such as aluminum, titanium, manganese, silver, lead, and chromium, and mixtures thereof. Alternatively, alloys of these single metals can also be used. For example, magnesium-silver, aluminum-lithium, aluminum-magnesium, silver-copper, zinc-silver, etc. can be used. Metal oxides such as indium tin oxide (ITO) can also be used. These electrode substances may be used alone, or two or more of them may be used in combination. The cathode may have a single-layer structure or a multilayer structure. In particular, silver may be preferably used, and, in order to suppress silver aggregation, silver alloys may be more preferably used. The alloying ratio may be any ratio as long as silver aggregation can be suppressed. For example, the silver-to-other-metal ratio may be 1:1, 3:1, or the like.

The cathode is not particularly limited. For example, an oxide conductive layer made of ITO or the like may be used to form a top-emission element, or a reflection electrode made of aluminum (Al) or the like may be used to form a bottom-emission element. The method for forming the cathode is not specifically limited: using direct-current or alternating-current sputtering is advantageous in terms of good film coverage and easy resistance reduction.

Pixel Separation Layer

A pixel separation layer is formed of a silicon nitride (SiN) film, a silicon oxynitride (SiON) film, or a silicon oxide (SiO) film formed using a chemical vapor deposition process (CVD process). To increase the resistance in the in-plane direction of the organic compound layer, the organic compound layer, in particular, the hole transport layer, may be preferably formed to be thin on the sidewall of the pixel separation layer. Specifically, it is possible to perform such a thin deposition on the sidewall by setting the tape angle of the sidewall of the pixel separation layer to be large and setting the layer thickness of the pixel separation layer to be large and by increasing vignetting during vapor deposition.

On the other hand, the side-wall taper angle of the pixel separation layer and/or the layer thickness of the pixel separation layer may be preferably adjusted in such a manner that no pores will be formed in a protective layer formed on the pixel separation layer. Since pores are not formed in the protective layer, it is possible to reduce the probability of occurrence of defects in the protective layer. Since the probability of occurrence of defects in the protective layer is reduced, it is possible to suppress low reliability such as generation of dark spots or occurrence of poor connection of the second electrode.

According to the present embodiment, even if the taper angle of the sidewall of the pixel separation layer is not steep, it is possible to effectively inhibit charge leakage to an adjacent pixel. As a result of the inventors' study, the inventors have found that a sufficient reduction can be achieved when the taper angle is 60° or greater and 90° or less. The pixel separation layer may preferably have a thickness of 10 nm or greater and 150 nm or less. The same effects can be obtained even if the pixel electrode does not include the pixel separation layer. However, in this case, it is advantageous to set the thickness of the pixel electrode to be less than or equal to a half of the thickness of the organic layer or to set the end of the pixel electrode to have a forward taper of less than 60° because this setting makes it possible to suppress the short circuiting of the organic EL element.

Organic Compound Layer

The organic compound layer may be formed of a single layer or multiple layers. When the organic compound layer includes multiple layers, they may be referred to as a hole injection layer, a hole transport layer, an electron-blocking layer, a light-emitting layer, a hole-blocking layer, an electron transport layer, and an electron injection layer in accordance with their functions. The organic compound layer is mainly composed of an organic compound, and may contain inorganic atoms and an inorganic compound. The organic compound layer may contain, for example, copper, lithium, magnesium, aluminum, iridium, platinum, molybdenum, zinc, etc. The organic compound layer may be disposed between the first electrode and the second electrode. The organic compound layer may be disposed in contact with the first electrode and the second electrode.

When more than one light-emitting layers are included, a charge generation portion may be disposed between a first light-emitting layer and a second light-emitting layer. The charge generation portion may contain an organic compound having a lowest unoccupied molecular orbital (LUMO) energy level of −5.0 eV or less. The same applies to a case where a charge generation portion is disposed between the second light-emitting layer and a third light-emitting layer.

Protective Layer

A protective layer may be provided on the second electrode. For example, a glass member provided with a moisture absorbent may be bonded to the second electrode so as to reduce the entry of, for example, water into the organic compound layer, thereby reducing the occurrence of display defects. In another embodiment, a passivation film made of, for example, silicon nitride may be provided on the cathode to reduce the entry of, for example, water into the organic compound layer. For example, after the formation of the cathode, the substrate may be transported to another chamber without breaking the vacuum, and a silicon nitride film having a thickness of 2 μm may be formed by a chemical vapor deposition (CVD) method to provide a protective layer. After the film deposition by the CVD method, a protective layer may be formed by an atomic layer deposition (ALD) method. The material of the layer formed by the ALD method, though not limited, may be silicon nitride, silicon oxide, aluminum oxide, etc. Silicon nitride may be deposited by the CVD method on the layer formed by the ALD method. The thickness of the layer formed by the ALD method may be less than the thickness of the layer formed by the CVD method. Specifically, the former may be 50% or less of the latter, or even 10% or less thereof.

Color Filter

A color filter may be provided on the protective layer. For example, a color filter may be provided on another substrate in consideration of the size of the organic EL element and be bonded to the substrate provided with the organic EL element. A color filter may be formed by patterning on the protective layer using photolithography. The color filter may be made of a polymer.

Planarization Layer

A planarization layer may be provided between the color filter and the protective layer. The planarization layer is provided for the purpose of reducing the unevenness of a layer provided underneath. The planarization layer may be referred to as a "material resin layer" without limiting its purpose. The planarization layer may be made of an organic compound. A low- or high-molecular-weight organic compound, preferably, high-molecular-weight one, may be used.

The planarization layers may be disposed above and below the color filter and may be composed of the same material or different materials. Specific examples thereof include polyvinyl carbazole resins, polycarbonate resins, polyester resins, acrylonitrile butadiene styrene (ABS) resins, acrylic resins, polyimide resins, phenolic resins, epoxy resins, silicone resins, and urea resins.

Microlens

The organic light-emitting device may include an optical member such as a microlens on the outgoing light side. The microlens can be made of, for example, an acrylic resin or an epoxy resin. The microlens may be used for increasing an amount of light emitted from the organic light-emitting device and for controlling the direction of the light emitted. The microlens may have a hemispherical shape. In a case where the microlens has a hemispherical shape, among tangents to the hemisphere, there is a tangent parallel to the insulating layer. The point of contact of the tangent with the hemisphere is the vertex of the microlens. The vertex of the microlens can be determined in the same way for any cross-sectional view. That is, among the tangents to the semicircle of the microlens in the cross-sectional view, there is a tangent parallel to the insulating layer, and the point of contact of the tangent with the semicircle is the vertex of the microlens.

The midpoint of the microlens can be defined. In a cross section of the microlens, when a segment is hypothetically drawn from the point where an arc shape ends to the point where another arc shape ends, the midpoint of the segment can be referred to as the midpoint of the microlens. The cross section to determine the vertex and midpoint may be a cross section perpendicular to the insulating layer.

The microlens has a first surface having a convex portion and a second surface opposite to the first surface. The second surface may be preferably disposed closer to the functional layer than the first surface. In order to obtain this configuration, it is necessary to form a microlens on the light-emitting device. When the functional layer is an organic layer, it is advantageous to avoid a process that involves a high temperature during a production step. When the second surface is closer to the functional layer than the first surface, the glass transition temperature of each organic compound constituting the organic layer may be preferably 100° C. or higher, or more preferably, 130° C. or higher.

Opposite Substrate

An opposite substrate may be provided on the planarization layer. The opposite substrate is disposed at a position corresponding to the substrate described above and thus is called an opposite substrate. The opposite substrate may be made of the same material as that of the substrate described above. When the above-described substrate is referred to as a first substrate, the opposite substrate may be referred to as a second substrate.

Organic Layer

The organic compound layer, such as a hole injection layer, a hole transport layer, an electron-blocking layer, a light-emitting layer, a hole-blocking layer, an electron transport layer, an electron injection layer, etc. included in the organic EL element according to one embodiment of the present disclosure is formed by a method described below.

For the organic compound layer included in the organic EL element according to one embodiment of the present disclosure, a dry process, such as a vacuum evaporation method, an ionized evaporation method, sputtering, or plasma, may be employed. Alternatively, instead of the dry process, it is also possible to employ a wet process in which a material is dissolved in an appropriate solvent and then a layer is formed by a known coating method, for example, spin coating, dipping, a casting method, a Langmuir-Blodgett (LB) technique, or an ink jet method.

When the layer is formed by, for example, a vacuum evaporation method or a solution coating method, crystallization and so forth are less likely to occur, and good stability with time is achieved. In a case where a coating method is used for forming a film, an appropriate binder resin may be combined therewith in the film formation.

Examples of the binder resin mentioned above include polyvinyl carbazole resins, polycarbonate resins, polyester resins, acrylonitrile butadiene styrene (ABS) resins, acrylic resins, polyimide resins, phenolic resins, epoxy resins, silicone resins, and urea resins, without any limitation to those enumerated here.

These examples of the binder resin may be used alone as a homopolymer or copolymer, or two or more of them may be used in combination as a mixture. Additives, such as a known plasticizer, antioxidant, ultraviolet absorber, etc. may be additionally used as needed.

Pixel Circuit

The light-emitting device may include pixel circuits connected to light-emitting elements. Each of the pixel circuits may be of an active matrix type, which independently controls the emission of first and second light-emitting elements. The active-matrix circuit may be based on voltage programming or current programming. A driving circuit includes a pixel circuit for each pixel individually. The pixel circuit may include a light-emitting element, a transistor to control the emission luminance of the light-emitting element, a transistor to control the timing of the light emission, a capacitor to retain the gate voltage of the transistor configured to control the emission luminance, and a transistor for connection to GND, not via the light-emitting element.

The light-emitting device includes a display area and a peripheral area disposed around the display area. The display area includes pixel circuits, and the peripheral area includes a display control circuit. The mobility of a transistor included in the pixel circuit may be lower than the mobility of a transistor included in the display control circuit.

The slope of the current-voltage characteristics of the transistor included in the pixel circuit may be less steep than the slope of the current-voltage characteristic of the transistor included in the display control circuit. The slope of the current-voltage characteristics can be measured on the basis of what is called Vg-Ig characteristics.

The transistor included in the pixel circuit is a transistor connected to a light-emitting element such as a first light-emitting element.

Pixel

The organic EL display device includes a plurality of pixels. Each pixel includes sub-pixels configured to emit light of colors different from each other. The sub-pixels may have respective emission colors of, for example, red, green, and blue (RGB).

Light emerges from a region of the pixel, also called a pixel aperture. This region is the same as a first region. The pixel aperture may be 15 μm or less, and may be 5 μm or greater. More specifically, the pixel aperture may be, for example, 11 μm, 9.5 μm, 7.4 μm, or 6.4 μm.

The interval between sub-pixels may be 10 μm. Specifically, the interval may be 8 μm, 7.4 μm, or 6.4 μm.

The pixels may be arranged in a known layout configuration in a plan view. For example, a stripe pattern, a delta pattern, a Pen Tile matrix pattern, or a Bayer pattern may be used. The shape of each sub-pixel in a plan view may be any known shape. Examples of the shape of the sub-pixel include quadrilaterals such as rectangles and rhombi, hexagons, and the like. Of course, if the shape is close to a rectangle though not exactly, it is encompassed within the scope of "rectangle". The shape of the sub-pixel and the pixel arrangement can be used in combination.

Uses/Applications of Organic EL Element According to One Embodiment of Present Disclosure The organic EL element according to one embodiment of the present disclosure can be used as a constituent member of a display device or a lighting device. Other applications include an exposure light source for an electrophotographic image forming apparatus, a backlight for a liquid crystal display device, and a light-emitting device including color filters in a white light source.

The display device may be an image information processing apparatus including an image input unit configured to receive image information from an area CCD, a linear CCD, a memory card, or the like, and including an information processing unit configured to process the input information, and configured to display the input image on a display unit.

The display unit of an imaging apparatus or an inkjet printer may have a touch panel function. The driving scheme of the touch panel function may be, but is not limited to, an infrared scheme, an electrostatic capacitance scheme, a resistive film scheme, or an electromagnetic inductive scheme. The display device may be used as a display unit of a multifunction printer.

Figure 15:
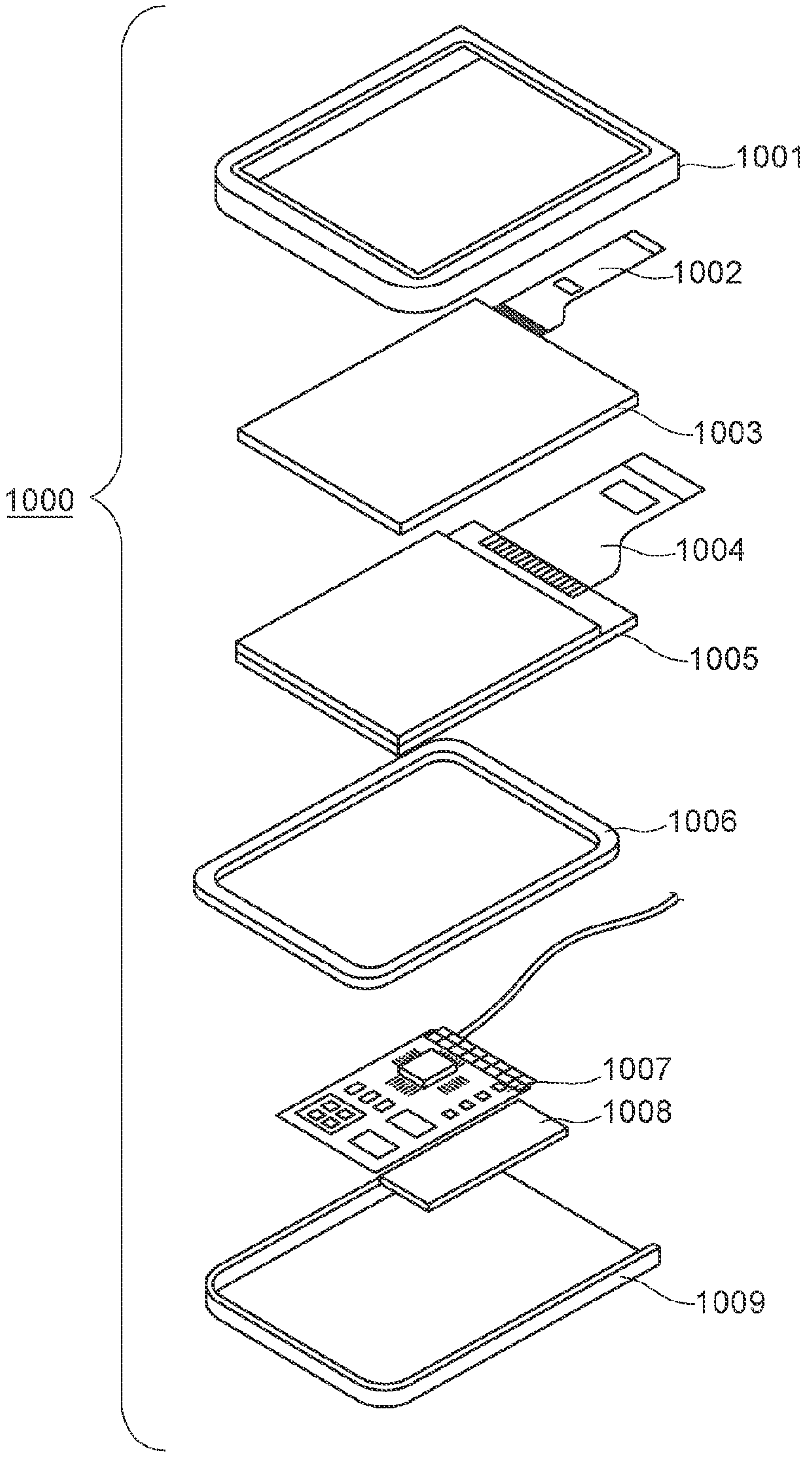
FIG. 15 is a schematic view illustrating an example of a display device according to one embodiment of the present disclosure.

FIG. 15 is a schematic view illustrating an example of a display device according to the present embodiment. A display device 1000 may include a touch panel 1003, a display panel 1005, a frame 1006, a circuit board 1007, and a battery 1008 that are disposed between an upper cover 1001 and a lower cover 1009. The touch panel 1003 and the display panel 1005 are connected to flexible printed circuits (FPCs) 1002 and 1004, respectively. The circuit board 1007 includes transistors printed thereon. The battery 1008 need not be provided unless the display device is a portable device. The battery 1008 may be disposed at a different position even in a case of a portable devices.

The display device according to the present embodiment may include a color filter having red, green, and blue portions. In the color filter, the red, green, and blue portions may be arranged in a delta layout.

The display device according to the present embodiment may be used as the display unit of a portable terminal. In that case, the display device may have both a display function and an operation function. Examples of the portable terminal include mobile phones such as smartphones, tablets, and head-mounted displays.

The display device according to the present embodiment may be used as a display unit of an imaging apparatus including an optical unit including a plurality of lenses and an image pickup element configured to receive light passing through the optical unit. The imaging apparatus may include a display unit configured to display information acquired by the image pickup element. The display unit may be a display unit exposed to the outside of the imaging apparatus or may be a display unit disposed in a viewfinder. The imaging apparatus may be a digital camera or a digital camcorder.

Figure 16A:
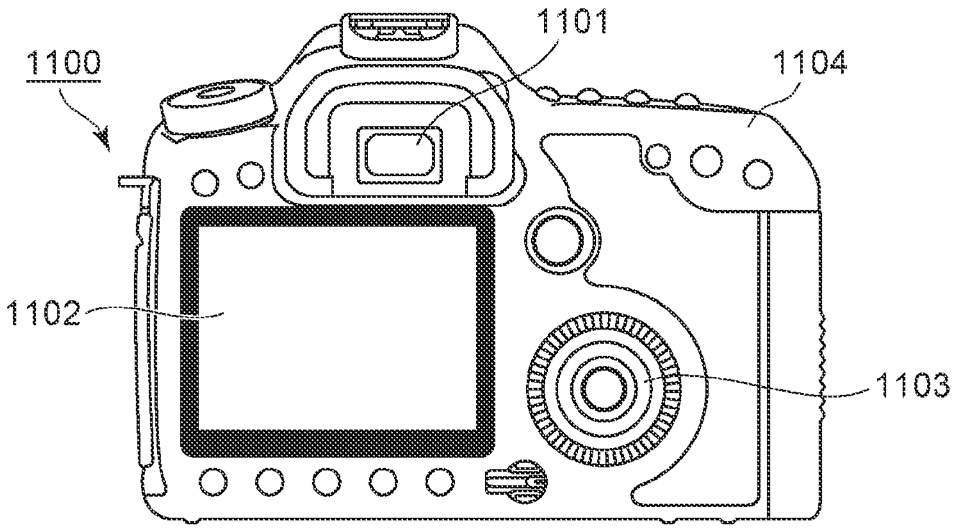
FIG. 16A is a schematic view illustrating an example of an imaging apparatus according to one embodiment of the present disclosure.

FIG. 16A is a schematic view illustrating an example of an imaging apparatus according to the present embodiment. An imaging apparatus 1100 may include a viewfinder 1101, a rear display 1102, an operation unit 1103, and a housing 1104. The viewfinder 1101 may include a display device according to the present embodiment. In that case, the display device may be configured to display not only a captured image but also environmental information, imaging instructions, and so forth. The environmental information may include, for example, the intensity of external light, the direction of external light, the moving speed of a subject, and the possibility that a subject is shielded by a shielding object.

A time opportunity suited for shooting is very short: therefore, it is advantageous to display information as quickly as possible. Using a display device with an organic light-emitting element according to the present disclosure is advantageous in this respect. This is because an organic light-emitting element offers a high response speed. A display device with an organic light-emitting element is more suited for uses for which display at a high speed is required than a liquid crystal display device.

The imaging apparatus 1100 includes an optical unit that is not illustrated. The optical unit includes a plurality of lenses and is configured to form an image on an image pickup element housed in the housing 1104. The plurality of lenses is focus-adjustable by adjusting their relative positions. This operation may be performed automatically. The imaging apparatus may be referred to as a photoelectric conversion apparatus. Instead of sequentially capturing images, the imaging apparatus may use the following method as its method of imaging: a method of detecting a difference from the previous image, a method of cutting out an image from a recorded image, or the like.

Figure 16B:
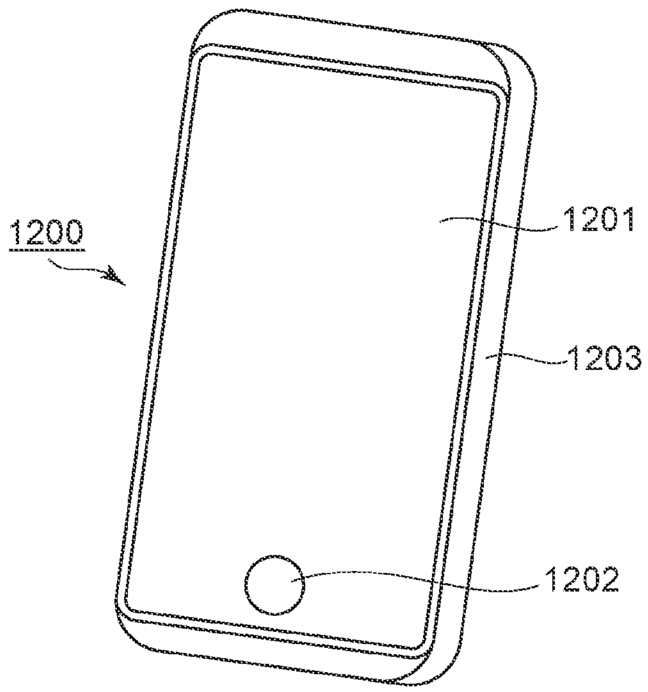
FIG. 16B is a schematic view illustrating an example of an electronic device according to one embodiment of the present disclosure.

FIG. 16B is a schematic view illustrating an example of an electronic device according to the present embodiment. An electronic device 1200 includes a display unit 1201, an operation unit 1202, and a housing 1203. The housing 1203 may accommodate a circuit, a printed circuit board including the circuit, a battery, and a communication unit. The operation unit 1202 may be a button or a touch-panel-type reactive unit. The operation unit may be a biometric authentication unit that recognizes a fingerprint to perform unlocking or the like. An electronic device including a communication unit can be referred to also as a communication device. The electronic device may further include a lens and an image pickup element to offer a camera function. An image captured using the camera function is displayed on the display unit. Examples of the electronic device include a smartphone, a notebook computer, and the like.

Figure 17A:
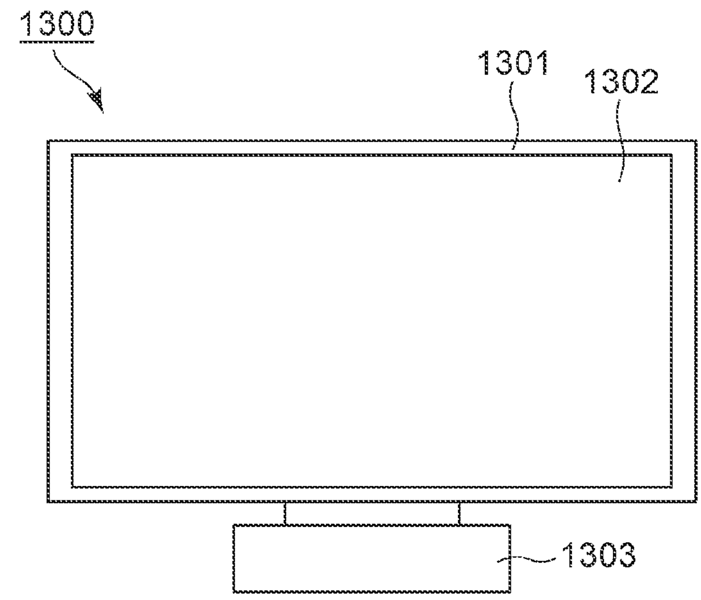
FIG. 17A is a schematic view illustrating an example of a display device according to one embodiment of the present disclosure.
Figure 17B:
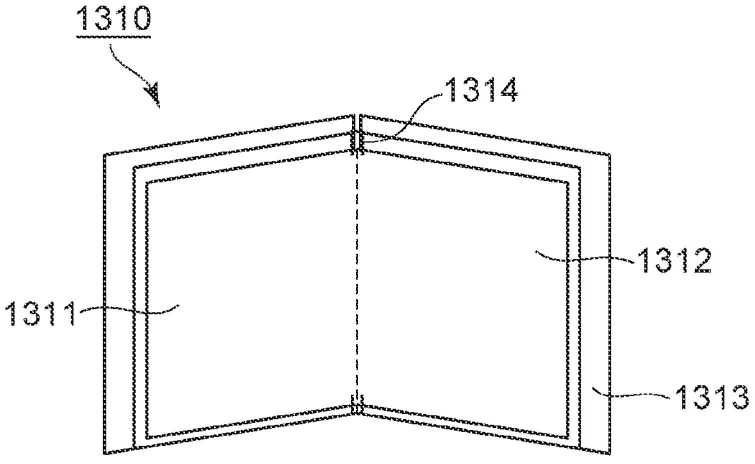
FIG. 17B is a schematic view illustrating an example of a foldable display device.

Each of FIGS. 17A and 17B is a schematic view illustrating an example of a display device according to the present embodiment. FIG. 17A illustrates a display device such as a television monitor or a PC monitor. A display device 1300 includes a frame 1301 and a display unit 1302. A light-emitting device according to the present embodiment may be used as the display unit 1302.

The display apparatus 1300 includes a base 1303 that supports the frame 1301 and the display unit 1302. The structure of the base 1303 is not limited to the example illustrated in FIG. 17A. The lower side of the frame 1301 may serve also as a base.

The frame 1301 and the display unit 1302 may be curved. Their radius of curvature may be 5,000 mm or greater and 6,000 mm or less.

FIG. 17B is a schematic view illustrating another example of a display device according to the present embodiment. A display device 1310 illustrated in FIG. 17B is a so-called foldable display device having a collapsible structure. The display device 1310 includes a first display portion 1311, a second display portion 1312, a housing 1313, and a bending point 1314. The first display portion 1311 and the second display portion 1312 may include a light-emitting device according to the present embodiment. The first display portion 1311 and the second display portion 1312 may be a single seamless display device. The first display portion 1311 and the second display portion 1312 can be divided from each other at the bending point. The first display portion 1311 and the second display portion 1312 may display images different from each other, or, alternatively, may work together to display a single image.

Figure 18A:
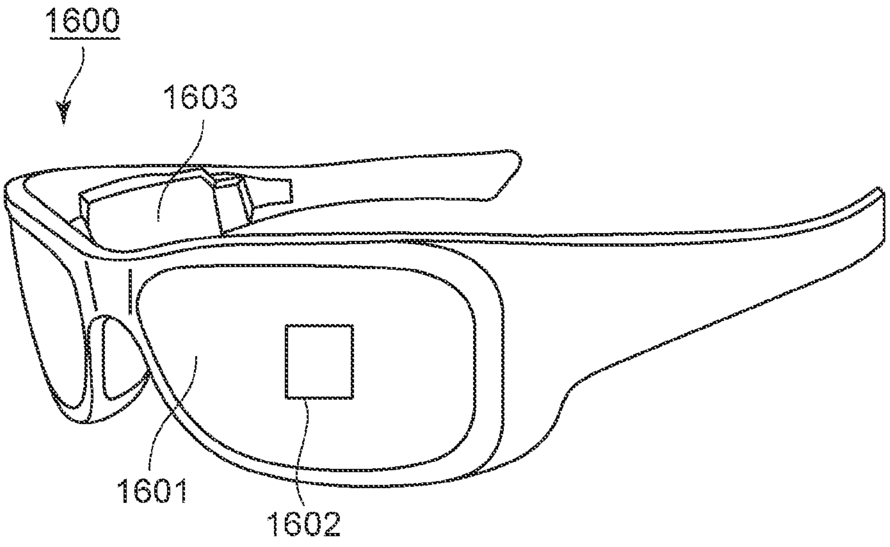
FIG. 18A is a schematic view illustrating an example of a wearable device according to one embodiment of the present disclosure.
Figure 18B:
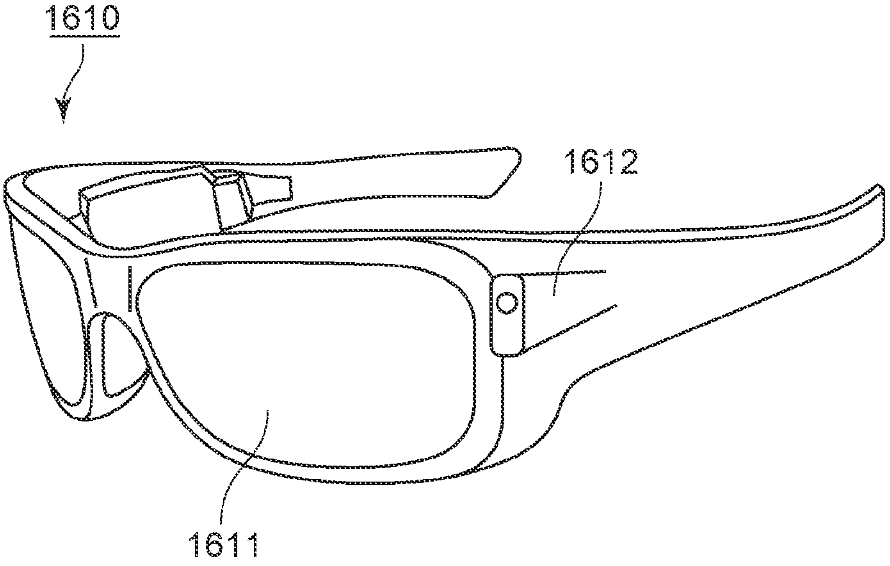
FIG. 18B is a schematic view illustrating an example of a wearable device according to one embodiment of the present disclosure with an imager.

With reference to FIGS. 18A and 18B, examples of applications of a display device according to each of the embodiments described above will now be described. The display device can be used for systems that can be mounted as wearable devices such as, for example, smart glasses, head-mounted displays (HMDs), or smart contact lenses. An image-pickup-and-display device used in such an example of applications includes an image pickup device capable of performing photoelectric conversion of visible light and a display device capable of emitting visible light.

FIG. 18A illustrates eyeglasses 1600 (smart glasses) according to an example of applications. An imager 1602 such as a complementary metal-oxide semiconductor (CMOS) sensor or a single-photon avalanche diode (SPAD) is provided on a front side of a lens 1601 of the glasses 1600. A display device according to any of the foregoing embodiments is provided on the back side of the lens 1601.

The eyeglasses 1600 further include a control device 1603. The control device 1603 functions as a power source that supplies electric power to the imager 1602 and the display device according to any of the embodiments. The control device 1603 controls the operation of the imager 1602 and the display device. An optical system for condensing light onto the imager 1602 is formed on the lens 1601.

FIG. 18B illustrates eyeglasses 1610 (smart glasses) according to an example of applications. The eyeglasses 1610 include a control device 1612. An imager corresponding to the imager 1602, and a display device, are mounted in the control device 1612. An optical system for projecting light emitted by the display device mounted in the control device 1612 is formed on the lens 1611. An image is projected onto the lens 1611. The control device 1612 functions as a power source that supplies electric power to the imager and the display device and controls the operation of the imager and the display device. The control device may include a gaze detector configured to detect the gaze of a wearer. Infrared radiation may be used for gaze detection. An infrared light-emitting unit emits infrared light to an eyeball of a user who is gazing at a displayed image. An image of the eyeball is captured by detecting the infrared light reflected by the eyeball by an image pickup unit including light-receiving elements. A decrease in image quality is reduced by providing a reduction unit configured to reduce light from the infrared light-emitting unit to the display unit in a plan view.

The user's gaze at the displayed image is detected from the image of the eyeball captured through the infrared-light imaging. Any known method can be used for detecting the gaze using the captured image of the eyeball. As an example, a gaze detection method based on a Purkinje image of the reflection of irradiation light on a cornea can be used.

More specifically, gaze detection processing based on a pupil corneal reflection method is performed. With the use of the pupil corneal reflection method, the user's gaze is detected by calculating a gaze vector representing the direction (rotation angle) of the eyeball on the basis of the image of the pupil and the Purkinje image included in the captured image of the eyeball.

A display device according to one embodiment of the present disclosure may include an imaging device including light-receiving elements, and may control an image displayed on the display device on the basis of the gaze information of the user from the imaging device.

Specifically, on the display device, a first display area at which the user gazes and a second display area other than the first display area are determined on the basis of the gaze information. The first display area and the second display area may be determined by the control device of the display device or may be determined by receiving those determined by an external control device. In the display area of the display device, the display resolution of the first display area may be controlled to be higher than the display resolution of the second display area. That is, the resolution of the second display area may be lower than that of the first display area.

The display area includes a first display area and a second display area different from the first display area, and an area having a higher degree of priority is determined from among the first display area and the second display area on the basis of the gaze information. The first field-of-view area and the second field-of-view area may be determined by the control device of the display device or may be determined by receiving those determined by an external control device. The resolution of an area of higher priority may be controlled to be higher than the resolution of an area other than the area of higher priority. That is, the resolution of an area of a relatively low priority may be low.

Artificial intelligence (AI) may be used for determining the first display area or the high-priority area. The AI may be a model configured to estimate the angle of gaze from the image of the eyeball and the distance to the target object lying ahead in the gaze direction, by using the image of the eyeball and the actual direction of gaze of the eyeball in the image as teaching data. The AI program may be stored in the display device, the imaging device, or an external device. In a case where the AI program is stored in the external device, the AI program is transmitted to the display device via communications.

In a case where display control is performed on the basis of visual detection, the disclosed technique can be applied to smart glasses that further include an imaging device configured to capture an external image. The smart glasses are capable of displaying the captured external information on a real-time basis.

As described above, using a display device according to the present disclosure makes it possible to provide a technique that is advantageous for enhancing image quality by reducing changes in the gate potential of a driving transistor.

Effects of Present Disclosure

The present disclosure makes it possible to provide a technique that is advantageous for achieving low driving power by reducing the amplitude of a control line for controlling a transistor of a pixel.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-068095, filed Apr. 18, 2023, and Japanese Patent Application No. 2024-016723, filed Feb. 6, 2024, which are hereby incorporated by reference herein in their entirety.

What is claimed is:

1. A display device comprising a pixel circuit, the pixel circuit comprising:
- a current-driven electro-optical element;
- a first power supply from which a current is supplied to the electro-optical element;
- a second power supply which is lower in potential than the first power supply;
- a signal line via which an image signal is supplied to the electro-optical element;
- a writing transistor whose first terminal is coupled to the signal line;

a driving transistor whose first terminal is coupled to a second terminal of the writing transistor, the driving transistor being configured to drive the electro-optical element in accordance with an image signal written by the writing transistor;

a correction transistor coupled between a gate of the driving transistor and a second terminal of the driving transistor;

a second switching transistor coupled between the second terminal of the driving transistor and an anode of the electro-optical element;

an initialization transistor coupled between the anode of the electro-optical element and the second power supply; and a capacitive element coupled between the gate of the driving transistor and the first power supply, wherein the correction transistor, the second switching transistor, and the initialization transistor are n-channel transistors, and a current driving power of the second switching transistor is greater than a current driving power of the correction transistor.

2. The display device according to claim 1, wherein the correction transistor, the second switching transistor, and the initialization transistor each include an oxide semiconductor in at least a part of an active region.

3. The display device according to claim 1, wherein the writing transistor is a p-channel transistor, and a gate of the writing transistor and a gate of the second switching transistor are connected to a same control line.

4. The display device according to claim 1, wherein a gate of the initialization transistor and a gate of the correction transistor are connected to a same control line.

5. The display device according to claim 1, the pixel circuit further comprising:

a first switching transistor coupled between the first terminal of the driving transistor and the first power supply, wherein the first switching transistor is a p-channel transistor, and a gate of the first switching transistor and a gate of the initialization transistor are connected to a same control line.

6. The display device according to claim 1, the pixel circuit further comprising:

a fourth power supply which is lower in potential than the first power supply; and a gate initialization transistor which provides a coupling between the capacitive element and the fourth power supply.

7. The display device according to claim 6, wherein the gate initialization transistor includes an oxide semiconductor in at least a part of an active region.

8. The display device according to claim 1, wherein the electro-optical element is an organic electroluminescence element.

9. An imaging apparatus, comprising:

optical hardware including a plurality of lenses;

an image pickup element configured to receive light passing through the optical hardware; and display hardware configured to display an image picked up by the image pickup element, wherein the display hardware includes the display device according to claim 1.

10. An electronic device, comprising:

a display unit according to claim 1;

a housing in which the display is provided; and a communication interface configured to perform external communication.

* * * * *